United States Patent [19]
Beimel et al.

[11] Patent Number: 5,764,767
[45] Date of Patent: Jun. 9, 1998

[54] SYSTEM FOR RECONSTRUCTION OF A SECRET SHARED BY A PLURALITY OF PARTICIPANTS

[75] Inventors: Amos Beimel, Michmoret; Ben-Zion Chor, Tel-Aviv, both of Israel

[73] Assignee: Technion Research and Development Foundation Ltd., Technion, Israel

[21] Appl. No.: 700,866

[22] Filed: Aug. 21, 1996

[51] Int. Cl.$^6$ ..................................... H04K 1/00
[52] U.S. Cl. ............................... 380/21; 380/30
[58] Field of Search ........................ 380/23, 21, 49, 380/30, 28

[56] References Cited

U.S. PATENT DOCUMENTS

| | | | |
|---|---|---|---|
| 5,016,274 | 5/1991 | Micali et al. | |
| 5,315,658 | 5/1994 | Micali | 380/30 |
| 5,557,765 | 9/1996 | Lipner et al. | 380/21 |
| 5,625,692 | 4/1997 | Herzberg et al. | 380/21 |

OTHER PUBLICATIONS

Communications of the ACM, Nov. 1979, vol. 22, No. 11, "How To Share a Secret", Adi Shamir, pp. 612–613.
Federal Information Processing Standards Publication 46, Jan. 15, 1977, "Data Encryption Algorithm", pp. 64–74.
The MIT Press, Chapter 2, "Introduction to Algorithms", Thomas H. Cormen et al., pp. 26–27 and 780–781.
Bell System Technical Journal, vol. 28, No. 4, Oct. 1949, "Communication Theory of Secrecy Systems", C.E. Shannon, pp. 656–715.
Ericsson Radio Systems AB, "An Optical Class of Symmetric Key Generation Systems", Rolf Blom, pp. 335–338.
15th Annual Intl. Cryptology Conf. Proceedings, Aug. 1995, Advances in Cryptology—Crypto '95, "Secret Sharing with Public Reconstruction", Amos Beimel et al., pp. 353–366.
12th Annual Intl. Cryptology Conf. Proceedings, Aug. 1992, Advances in Cryptology—Crypto '92, "On the Information Rate of Secret Sharing Schemes", C. Blundo, et al. pp. 148–167.
13th Annual Intl. Cryptology Conf. Proceedings, Aug. 1993, Advances in Cryptology—Crypto '93, "Interaction in Key Distribution Schemes", Amos Beimel et al., pp. 444–455.
IEEE Transactions on Information Theory, vol. IT–22, No. 6, Nov. 1976, "New Directions on Cryptography", Whitfield Diffie et al., pp. 644–654.
G.R. Blakely, "Safeguarding cryptographic keys", Proc. AFIPS 1979 NCC, 48:313–317, Jun. 1979.

*Primary Examiner*—David C. Cain
*Attorney, Agent, or Firm*—Oliff & Berridge, PLC

[57] ABSTRACT

A method for reconstructing a secret, over a public communication channel, using a perfect t-out-of-n secret sharing scheme. The scheme having a dealer which utilizes a delivering procedure for privately delivering n secret shares of the secret along with n keys to n participants that are interlinked by the channel. The scheme further having a secret reconstructing procedure for being executed by selected recipient participants, for reconstructing the secret by utilizing self secret share of the recipient participant and 1-1 secret shares of the other participants. The secret reconstructing procedure includes the following steps:

(i) receiving over said public communication channel 1-1 encoded secret shares from the 1-1 participants, respectively;

(ii) decoding each one of the 1-1 encoded secret shares, thereby obtaining 1-1 decoded secret shares; and (iii) reconstructing the secret from the 1-1 decoded secret shares and from the self secret share of the recipient participant.

43 Claims, 12 Drawing Sheets

| P # | SECRET SHARE |
|---|---|
| P1 | S1 |
| P2 | S2 |
| P3 | S3 |
| P4 | S4 |
| P5 | S5 |
| P6 | S6 |

SYSTEM FOR RECONSTRUCTION OF A SECRET SHARED BY A PLURALITY OF PARTICIPANTS

FIELD OF THE INVENTION

The present invention is in the field of cryptography in general, and more specifically concerns a method and system for reconstruction of a secret shared by a plurality of participants.

BACKGROUND OF THE INVENTION

Secret sharing is a well known scheme in the field of cryptography which affords any t out of n participants to reconstruct a secret. The secret may be, for example, a code for opening a safe.

Secret sharing schemes are particularly useful in those cases where a protected resource should be accessed or activated only upon the discretion of at least two participants ($t \geq 2$) from among larger group of authorized participants (n).

An example of a protected resource is a sealed safe holding sensitive information wherein the decision to open the safe i.e. accessing the code (secret) for opening the safe should, preferably not depend upon the discretion of only one person. Another example is a sensitive document which includes substantial undertakings of an industrial firm and on which at least two out of say five senior partners should sign.

Relying on the discretion of at least t members selected out of n authorized members as opposed to a situation where only one member accesses a protected resource, substantially reduces or even eliminates the risk of inadvertent or deliberate mistakes in activating the protected resource (or the execution of a privileged action) which, if occurred, could lead to unrecoverable damage.

A sound secret sharing scheme whilst affording the reconstruction of the secret by any t (or at least t) participants from among authorized n participants, should at the same time ensure that any conspiracy by k members (k<t) from among said n members to reconstruct the secret would not only be incapable of succeeding in reconstructing the secret but would also not obtain any clue, albeit evaluating all their shares, on the contents of the secret as a whole.

Secret sharing schemes which meet these provisions were introduced back in 1979 (see for example: A. Shamir, "How to share a Secret". *Commmunications of ACM*, 22:612–613, 1979 - hereinafter Shamir or Shamir technique; and G. R. Blakely, "Safeguarding cryptographic keys", *Proc. AFIPS 1979 NCC, 48:313–317*, June 1979 - hereinafter Blakely, or Blakely technique) and were the subject of considerable subsequent academic work.

In these systems, a dealer holds a secret piece of information, e.g. a number signifying unequivocally the consent of a firm to the undertakings outlined in a given business document. The dealer delivers by utilizing a private channel, one share of the secret to each one of n participants. Each participant makes sure that its respective share, is securely stored, i.e. is not accessible to any other third party.

When a number of authorized participants (t), from among said n members ($t \leq n$), decide to reconstruct the secret, they do so by the collection of their shares. It should be noted that all hitherto known secret sharing schemes necessitate that the collecting of the shares should employ a private channel, i.e. the t members are either secretly meet and exchange their shares, or, they utilize a private communication channel which is secured against eavesdropping, for transmitting their shares, e.g. a private telephone line accessible to only the specified authorized participants.

Utilizing a private channel in the course of reconstructing the secret, constitutes a significant drawback in that private channels are expensive and not commonly available resources, hence rendering the secret reconstruction phase cumbersome and pose undue constrains on the overall use of the hitherto known secret sharing schemes.

As is well known to those versed in the art, public channel (e.g. conventional telephone line) along with the utilization of known per se encryption techniques purports to afford emulated private channel. Known encryption techniques are for example the famous RSA algorithm, and/or the known Data Encryption Standard (DES) described in detail in DATA Encryption Standard, Federal Information Processing Standards Publication 46, Jan. 15, 1977. The utilization of the DES necessitates secretly transmitting a unique key to the communicating participants.

In a typical emulation sequence, a sender (A) that wishes to send a message to a recipient (B) over an emulated private channel of the kind specified encrypts the message by utilizing, for example, one of the aforementioned encryption techniques and a given encryption key and transmits the encrypted message over a public communication channel. Having received the encrypted message, the recipient exploits a corresponding deciphering key for reconstructing the message. According to the latter scenario, a private channel is "emulated" in the sense that third parties listening to the channel are seemingly unable to decode the encrypted messages that are transmitted over the channel. However, as specified in the foregoing and as is well known to those versed in the art a public channel in conjunction with an encryption technique do not perfectly emulate a private channel since the encrypted message that is transmitted over the public channel is nevertheless susceptible to cracking depending upon various factors such as the characteristics of the encryption key that is utilized, the length of the encryption/deciphering key and others.

Accordingly, using secret sharing scheme that exploits emulated private channels, of the kind specified, for reconstructing secrets by the authorized t parties can lead in certain scenarios to the leaking of the secret also to unauthorized eavesdropper which managed to decode the transmitted messages. Moreover, software realization of the specified conventional encryption technique normally carries a penalty in terms of high complexity of computation, and whereas utilizing hardwired logic realization expedites the computation, this is at the expense of high penalty in terms of costs, to an extent which from commercial point of view can render the use of such a solution commercially infeasible.

There is accordingly a long felt need for incorporating in hitherto known secret sharing schemes, a relatively simple solution, which affords secured reconstruction of secrets over a conventional public channel and which preferably avoid the use of the relatively computationally-complex encryption techniques.

GLOSSARY

For a better understanding a glossary of terms and definitions used herein is presented. Some of the terms are conventional and others are coined.

1) Order of - $O(g(n))$: A function $f(n)$ is $O(g(n))$ if there exist positive constants c and N such that $f(n) < c\ g(n)$ for all $n > N$; Thus for example, for input of size n bits, $2n+3$ computational steps are deemed O(n) computational steps (c=4, N=1); $2n^2+4n+5$ and $n^2$ computational steps are deemed both $O(n^2)$ computational steps (c=6, N=1 and c=2, N=1, respectively), whereas 20 computational steps (regardless of the size of n) are deemed O(1). (For detailed definition, see: Thomas H. Cormen, Charles E. Leiserson, Ronald L. Rivest;

"Introduction to Algorithms", The MIT Press Cambridge, Mass. London England, Chapter 2 pp. 26).

2) Conventional Secret Sharing Scheme: A system with n participants denoted by $\{P_1, P_2, \ldots, P_n\}$. In addition to the participants, there is a dealer in the system, who has a secret input s. A scheme is a probabilistic mapping, which the dealer applies to the input, and generates n pieces of information. These pieces of information are designated secret shares, and the $i^{th}$ piece is called the secret share of $P_i$ (or $i^{th}$ secret share). For every i, the dealer gives the $i^{th}$ secret share to $P_i$ discretely. The dealer is only active in this initial stage. After the initial stage, the participants can communicate, using a private communication channel (see below) in order to reconstruct the secret. They operate according to some pre-defined, possibly randomized, protocol. The participants are honest, in the sense that they follow their protocols, but nevertheless they are curious and after the protocol has ended some of them can collude and try to gain some partial information on the secret, or shares thereof held by other participants.

3) Private Communication Channel: A communication channel which ensures that messages transmitted between $P_i$ and $P_j$ are incomprehensible to all $P_k(k \neq i, k \neq j)$.

4) Public Communication Channel: A public communication channel, e.g. a conventional telephone line, which is inherently susceptible to eavesdropping by an interested third party.

5) Conventional t-out-of-n Secret sharing with public reconstruction (according to the prior art): Let S be a finite set of secrets. A conventional t-out-of-n secret sharing scheme is the scheme described in section (2) above which exploits however a public communication channel in lieu of a private channel for the purpose of reconstructing the secret. It further satisfies the following two conditions:

1. Reconstruction requirement:

Any set of participants whose size is at least t (hereinafter, reconstructing set) can reconstruct the secret (taken from S), i.e. the value of the secret after communicating among themselves. Any participant in the reconstructing set obtains the value of the secret with certainty.

2. First level of Security:

Every disjoint coalition B of size at most t-1 has no information on the secret from its shares as defined below:

$$Pr[COALITION\_SHARE_B|X=S_1]=Pr[COALITION\_SHARE_B|X=S_2].$$

Coalition share is defined as the shares that were dealt to the coalition's members. The probability is taken over the random inputs of the dealer. No assumption is made on the distribution of the secrets X.

It should be noted that as opposed to "second level of security" (see below), the first level of security does not apply to the situation where the protocol is terminated and each party holds not only the shares as specified in the foregoing but also all the communication that was exchanged. Put differently, the first level of security is confined only to the shares and not to the communication that had been exchanged. The limitation of this technique is that after reconstruction, parties which did not participate in the reconstruction will nevertheless acquire knowledge on the contents of the secret. This limitation stems from the fact that the attempt to "simulate" reconstruction over a private channel (where the latter limitation is eliminated) on a public channel by utilizing conventional encryption techniques (e.g. R.S.A.) is not ideal. As mentioned before such encryption techniques are inherently susceptible to cracking which may possibly lead to a leak of messages, transmitted between the members of the reconstructing set, to unauthorized parties. Should this scenario occurs, it is, of course, no longer possible to assure that no partial information about the contents of the secret is gained.

6. Perfect Encryption system: In accordance with Shannon classical paper: C. E. Shannon, "Communication Theory of Secrecy Systems", *Bell System Technical Journal,* 28(4):656–715, 1949, a criterion is set for determining whether a "secrecy system" is deemed "perfectly secret". In a Secrecy system, according to Shannon, a participant P1 transmits, over a secret channel, a secret message which was encrypted by using a secret key k to a recipient P2 which decodes the message by using the same secret key k. A secrecy system of this kind is deemed "perfectly secret" if for any listening party, other than P1 and P2, the aposteriori probability that the secret message equals a certain value, i.e. after interception of messages equals the a priori probability that the secret message equals the same value.

7. Perfect t-out-of-n Secret Sharing Scheme with Public Reconstruction (according to the invention): is a conventional t-out-of-n Secret Sharing Scheme, which provides however a "second level of security", to wit:

2. Second level of Security:

Every disjoint coalition B of size at most t-1 has no information on the secret as defined below:

Assuming B is a bad coalition (set of parties). The view of B, denoted by $VIEW\_ALL_B$, is all the information it has, i.e. the shares of the parties in the coalition and the messages exchanged by all parties over the communication channels. The coalition B has no information on a random variable X if for every two possible value $S_1, S_2$, of X:

$$Pr[VIEW\_ALL_B|X=S_1]=Pr[VIEW\_ALL_B|X=S_2],$$

where the probability is taken over the random inputs of the dealer. As before, no assumption is made on the distribution of X.

Accordingly, the second level of security extends also to the exchanged communication.

Perfect t-out-of-n Secret Sharing Scheme with public reconstruction complies, thus, with the aforementioned definition of Perfect Encryption system, (such a system is regarded also as having a perfectness attribute).

If desired, in the perfect t-out-of-n Secret Sharing Scheme with Public Reconstruction, a key is distributed to each participant $P_i$ for encoding messages before transmitting them over the communication channel and decoding messages received from the members of the reconstructing set.

The keys, which are secretly delivered to the n participants by the dealer, are composed, each, of n-1 constituents with respect to the n-1 participants respectively. Each constituent, typically but not necessarily, consists of two one-time pads (for a definition of "one-time pad" see below) that are used during the reconstruction sequence in order to simulate a private channel on a public one. Preferably, the dealer exploits the private distribution of the secret shares also for privately distributing the keys, e.g. by appending the key to the corresponding secret share.

In the hitherto known private channel scenario, reconstruction is typically done by exchanging secret shares among participants. To enable such an exchange with every other participant over public communication channel, each participant $P_i$ will need two pads per participant $P_j$ ($j \neq i$), one for encoding a message (typically but not necessarily a secret share) prior to sensing it over the communication channel (with $P_j$ the designated destination) and one for decoding an encoded message received from $P_j$. It should be noted that since there is no in advance knowledge on the identity of the reconstructing set (i.e. who are the members that will eventually participate in the secret reconstruction phase), the dealer should accommodate any possible situation, and therefore he should deliver to each participant encoding and decoding keys with respect to any one of the remaining members of the reconstructing set.

The t-out-of-n Secret Sharing Schemes with Public Reconstruction are classified into two main categories, i.e. Unrestricted and One time schemes.

In an unrestricted scheme, the second level of security is guaranteed even if any collection of sets (possibly all) will reconstruct the secret using the public communication channel. Put differently, second level of security is retained even if two or more subsequent reconstruction sequences occur. The latter characteristics necessarily entail that any disjoint set is unable to reconstruct the secret despite the knowledge of the secret share of its members, and all communications that took place in the current and all the preceding reconstruction sequences.

In one-time scheme, the second level of security is guaranteed only if one set reconstructs the secret, i.e., the security will be adversely affected if a succeeding reconstruction phase occurs which involves different participants.

Regardless of whether an unrestricted or a one-time scheme is concerned, the second level of security should hold for any disjoint coalition of at most t-1 participants. As a special case, an extraneous listener who heard all communications but has no shares should gain no information about the secret.

8. One time Pad: A perfect encryption system in which a sender and a receiver have a secret private key, whose length is the length of the message. The key is used only for one encryption and decryption. The encryption is effected for example by xoring the key and the message or by modular addition of the key and the message (see also Shannon ibid.). The utilization of one-time-pad in lieu of the specified conventional encryption techniques enables to extend the security from only the secret shares per-se ("first level of security") also to the messages exchanged over the public communication channel ("second level of security").

9. Size of (key, secret, secret share etc.): - The lengths in bits of the key, secret or secret share.

10. Participant share: Refers to, collectively, the secret share and the key of a participant.

SUMMARY OF THE INVENTION

It should be noted that throughout the following text "Perfect t-out-of-n Secret Sharing Scheme with Public Reconstruction" is occasionally referred to also as "t-out-of-n Secret Sharing Scheme" (system), or in short "the scheme" (system).

It should be noted, that the term "secret" is not confined to some kind of a code or a signature, but rather it encompasses any type of data to be shared and later reconstructed by more than one participant, e.g. a secret may signify a document that is partitioned between n participants and which can be later reconstructed and viewed in its entirety by t participants from among the n participants.

In accordance with the invention, several schemes are afforded in order to facilitate reconstruction of a secret transmitted over public channels in a t-out-of-n secret sharing scheme. It should be noted, that regardless of the embodiment under consideration, all n participants receive respective secret shares and keys so as to enable any set of t participants from among said n participants to reconstruct the secret.

As is well known to those versed in the art, one of the serious limitations of any system which exploits secret keys is how to securely store them. The commercially available solutions are predominantly protected storage media, such as a hard-disk associated with software/hardware means for prohibiting access by unauthorized participants, smart cards and others. Whilst owing to their hardware nature, smart cards are considered a relatively reliable solution for securely storing secret keys, they employ, as a rule, a relatively small memory capacity by virtue of the relatively high costs thereof. Accordingly, insofar as smart cards and equivalent solutions are concerned, it is desired to minimize the size of each participant share that has to be securely stored so as to accommodate the relatively limited memory capacity.

Thus, the present invention not only presents a general Perfect t-out-of-n Secret Sharing Scheme with Public Reconstruction, but also offers various embodiments which utilize small participant share and/or reduced communication volume over the public channel during secret reconstruction sequence.

According to one embodiment of an unrestricted t-out-of-n secret sharing scheme of the invention (hereinafter first embodiment), the dealer prepares and delivers privately, in a known per se manner, to each participant from among the n participants his original secret share. The private sharing may be implemented, for example, by transmitting the secret shares to each participant over a private communication channel. During system initialization, the dealer further delivers to each participant a key composed of n-1 constituents, with respect to the n-1 participants, respectively, each of which consists of two pads (one for encoding and one for decoding), which as specified will enable exchange of encoded secret shares over the public communication channel. The pad size equals, of course, that of the secret share, and as typically the secret share size equals that of the secret, the overall participant share consists of 2(n-1) pads plus the self secret share i.e. the participant share size amounts to 2n-1 times the secret size, or O(n) multiplicative factor increase in the size of each secret.

The precise reconstruction procedure in accordance with the first embodiment of the invention is described in detail below. It should be nevertheless stated that in accordance with the first embodiment of the invention any one of the t participants transmits its secret share (in an encoded form) to all the remaining t-1 participants. This results in t(t-1) transmitted messages, i.e. $O(t^2)$ transmissions. The first embodiment applies, of course, also to l participants (l>t), but this at the cost of $O(l^2)$ transmissions over the communication channel.

By a modified embodiment (hereinafter modified first embodiment) one of said t participants is selected to be the "leader" (e.g. the one having the lowest identification index) and all the remaining t-1 participants transmit their encoded secret share to the leader. The latter exploits the appropriate key constituents vis-a-vis the t-1 participants in order to decode the received secret shares and by utilizing also his own secret share, the leader is capable of reconstructing the secret and thereafter distributing it (in an encoded form) to the remaining t-1 participants.

Having received the encoded secret from the leader, each of the t-1 participants utilizes the appropriate key constituent for decoding the secret.

Accordingly, the secret reconstruction is effected only by the "leader" (and is then distributed to the remaining t-1 participants), whereas in accordance with the first embodiment the secret is reconstructed by each one of the t participants.

Seeing that there is no in-advance knowledge on who is the leader, each participant should hold a separate key for each potential leader, i.e. for each one of the remaining n-1 participants.

Thus, whilst the modified first embodiment does not offer improvement in terms of the size of each participant share, i.e. it is retained at O(n), it affords improvement in terms of the complexity of communication. The improvement is obtained since now only t-1 message transmissions are required, originating from the t-1 participants (holding, each, a respective encoded secret share) and addressed to the leader, and an additional t-1 transmissions originating from the leader and addressed to the respective t-1 participants each of which contain the encoded secret.

Thus, there are overall 2(t-1) transmissions, i.e. O(t) transmissions as opposed to $O(t^2)$ in the first embodiment. Optionally l participants (l>t) can reconstruct the secret at the cost of (t+l-2) transmissions. As will be explained in greater detail below, both the first and the modified first schemes are of the unrestricted type.

There is further provided in accordance with a second embodiment of the invention a substantially more efficient scheme, being of the unrestricted type in which any number of authorized sets, each containing at least t participants, may reconstruct the secret, after communicating over the public channel. The operation of the t-out-of-n secret sharing scheme according to this embodiment will be explained in greater detail below, but it should be nevertheless stated that the size of each participant share, according to the second embodiment, is O(n/t) times the size of the original secret and as such it constitutes an advantage over said first and modified first embodiments.

Moving now to one-time schemes, there is provided in accordance with a third embodiment of the invention, a one-time-scheme wherein a single authorized set of at least t participants can reconstruct the secret. By this embodiment the size of each participant share is O(log n/t) times the size of the original secret.

By another aspect of the third embodiment (hereinafter modified third), there is provided a one-time-scheme wherein a single authorized set of exactly t participants reconstruct the secret. By this embodiment the size of each participant share is O(1) times the size of the original secret, i.e. the secret size multiplied by a constant.

There is thus provided in accordance with the invention, a method for reconstructing a secret, over a public communication channel, using a perfect t-out-of-n secret sharing scheme; the t-out-of-n secret sharing scheme having a dealer which utilizes a delivering procedure for privately delivering n secret shares of said secret along with n keys to respective n participants that are interlinked by said public communication channel; the key that is delivered to each one of said n participants is composed of, or is serving for generating n-i key constituents for respectively communicating, over said public communication channel, with the remaining n-1 participants from among said n participants;

said secret sharing scheme further having a secret reconstructing procedure for being executed by each one of at least one recipient participant selected from a group of l participants from among said n participants, for reconstructing said secret by utilizing self secret share of said recipient participant and l-1 secret shares of the remaining l-1 participants from among said l participants;

said secret reconstructing procedure, executed by each one of said recipient participants, comprising the following steps:

(i) receiving over said public communication channel l-1 encoded secret shares from the l-1 participants, respectively; the l-1 encoded secret shares being generated, each, by one and different participant from among said l-1 participants, by applying an encoding function which utilizes a key constituent from among said n-1 key constituents that is adapted for communicating between said one participant and said recipient participant;

(ii) decoding each one of said l-1 encoded secret shares, thereby obtaining l-1 decoded secret shares; the l-1 decoded secret share are obtained, each, by applying a decoding function that utilizes said key constituent, stipulated in step (i), that is adapted for communication between said one participant and said recipient participant; and (iii) reconstructing said secret from the l-1 decoded secret shares and from the self secret share of the recipient participant.

The invention further provides for, a method for reconstructing a secret, over a public communication channel, using a perfect t-out-of-n secret sharing scheme; the t-out-of-n secret sharing scheme having a dealer capable of partitioning said secret to t sub-secrets each of which being subjected to a delivering procedure for privately delivering n sub secret shares thereof to respective n participants that are interlinked by said public communication channel; said dealer is further capable of privately delivering n keys to the respective n participants; the key that is delivered to each one of said n participants is composed of, or is serving for generating, n-1 key constituents for respectively communicating, over said public communication channel, with the remaining n-1 participants from among said n participants;

said secret sharing scheme further having a secret reconstructing procedure for being executed by each one of l participants (l≧t), constituting, respectively, l recipient participants, from among said n participants, for reconstructing said secret by utilizing a self secret share of said recipient participant and l-1 secret shares of the remaining l-1 participants from among said l participants;

said secret reconstructing procedure, executed by each one of t participants from among said l recipient participants, comprising the following steps:

(i) receiving over said public communication channel t-1 encoded sub secret shares from the remaining t-1 participants, from among said t participants; the t-1 encoded sub secret shares being generated, each, by one and different participant from among said t-1 participants, by applying to said sub secret share an encoding function which utilizes a key constituent from among said n-1 key constituents that is adapted for communicating between said one participant and said recipient participant;

(ii) decoding each one of said t-1 encoded sub secret shares, thereby obtaining t-1 decoded sub secret shares; the t-1 decoded sub secret shares are obtained, each, by applying thereto a decoding function that utilizes said key constituent, stipulated in step (i), that is adapted for communication between said one participant and said recipient participant;

(iii) reconstructing said sub secret from the t-1 decoded sub secret shares and from the sub secret share of the recipient participant;

said secret reconstructing procedure, further comprising the steps (iv)–(vi), executed by each one of said I recipient participants:

(iv) receiving over said public communication channel t or t-1 encoded sub secrets from said t or t-1 participants, respectively; the t or t-1 encoded sub secrets being generated, each, by one and different participant from among said t or t-1 participants, by applying to said sub secret an encoding function which utilizes a key constituent from among said n-1 key constituents that is adapted for communicating between said one participant and said recipient participant;

(v) decoding each one of said t or t-1 encoded sub secrets so as to obtain t or t-1 decoded sub secrets; the t or t-1 decoded sub secrets are obtained, each, by applying thereto a decoding function that utilizes said key constituent, stipulated in step (iv), that is adapted for communication between said one participant and said recipient participant, thereby accomplishing t sub secrets; and (vi) reconstructing said secret from the t sub secrets.

Still further, the invention A system for reconstructing a secret, over a public communication channel, using a perfect t-out-of-n secret sharing scheme; the t-out-of-n secret sharing scheme having a dealing means for privately dealing n secret shares of said secret along with n keys to respective n participants interlinked by said public communication channel; for each participant, the key that is dealt thereto is composed of, or is associated with generating means for generating n-1 key constituents for respectively communicating, over said public communication channel, with the remaining n-1 participants from among said n participants;

said secret sharing scheme further having a secret reconstructing means associated with each of at least one recipient participant selected from a group of l participants from among said n participants, for reconstructing said secret by utilizing self secret share of said recipient participant and l-1 secret shares of the remaining l-1 participants from among said l participants; said secret reconstructing means associated with each of said at least one recipient participant is capable of:

(i) receiving over said public communication channel l-1 encoded secret shares from the l-1 participants, respectively; the l-1 encoded secret shares being generated, each, by one and different participant from among said l-1 participants, by applying an encoding function which utilizes a key constituent from among said n-1 key constituents that is adapted for communicating between said one participant and said recipient participant;

(ii) decoding each one of said l-1 encoded secret shares, thereby obtaining l-1 decoded secret shares; the l-1 decoded secret share are obtained, each, by applying a decoding function that utilizes said key constituent, stipulated in step (i), that is adapted for communication between said one participant and said recipient participant; and (iii) reconstructing said secret from the P-1 decoded secret shares and from the self secret share of the recipient participant.

BRIEF DESCRIPTION OF THE DRAWINGS

For a better understanding the invention will now be described, by way of non limiting examples, with reference to the accompanying drawings in which.

DETAIL DESCRIPTION OF SPECIFIC EMBODIMENTS

In traditional secret sharing schemes (with private channel reconstruction), while one set reconstructs the secret, no information is leaked to disjoint coalitions (due to the security of the communication channels). Hence, these schemes are always unrestricted. Furthermore, in traditional schemes, if a set can reconstruct the secret, then every super-set of the set can reconstruct the secret. However, secret sharing schemes with public reconstruction do not necessarily have this monotone property, since it is not necessarily possible to "distribute" the secret to members of a super-set without leaking information with respect to the secret to other participants.

Figure 1:
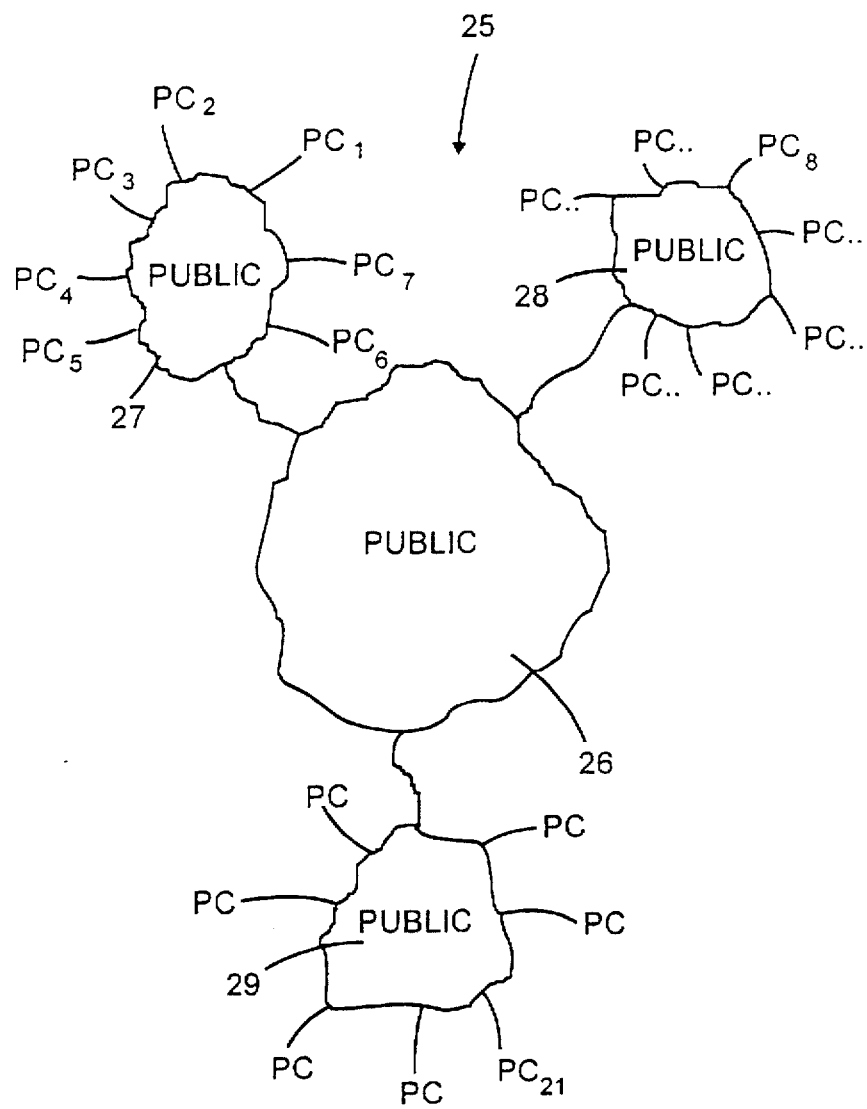
FIG. 1 is a schematic illustration showing n participants interlinked through a public communication network.

Bearing this in mind, attention is first directed to FIG. 1, showing a schematic illustration of n participants interlinked through a public communication network. As shown a plurality of participants associated each e.g. with personal computer (PC) (1–21, respectively) are interlinked by means of public communication channel 25 consisting, by way of example, of four segments 26–29 respectively. The public network illustrated in FIG. 1 is of the conventional type being wired, cellular or any other known per se communication network that is strategically geographically distributed depending upon the particular application. Thus, for example it may extend to a limited geographical regions, or, if desired, extend to different continents for affording international communication.

Figure 2:
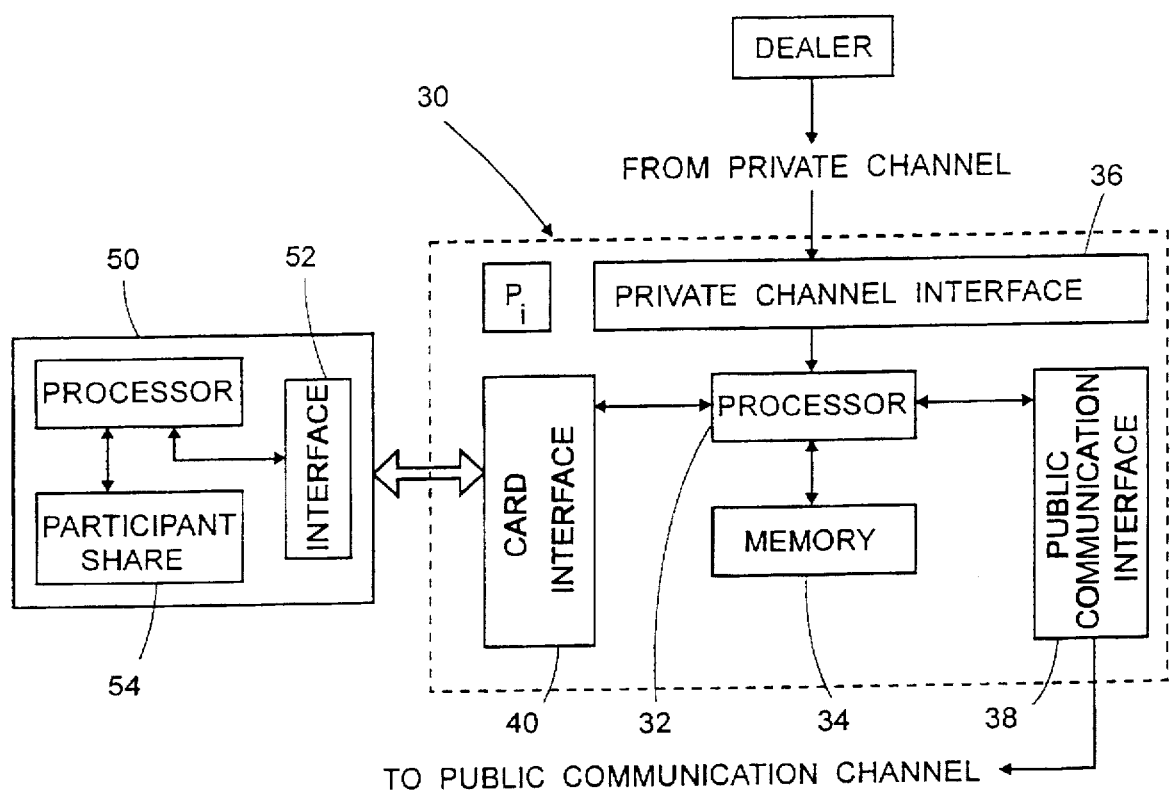
FIG. 2 is a generalized block diagram of the hardware components used by each participant of FIG. 1.

Attention is now directed to FIG. 2, showing a generalized block diagram of the hardware components that are used by each participant of FIG. 1. Thus, a typical, yet not exclusive structure of the hardware components that are associated with each participant include main module 30 accommodating a processor 32 coupled to memory modules 34 for holding and executing the code associated with the secret sharing scheme of the invention. Module 30 further accommodates private channel interface 36 for communicating with the dealer in order to secretly receive the secret share and key for participant Pi (i=1, . . . n). Module 30, further accommodates public communication interface 38 coupled to processor 32, for interfacing the public communication channel. Obviously, the public communication interface 38 should be adapted to the nature of the communication channel e.g. cellular, or various types of wired channel.

Finally, module 30 accommodates card interface 40 for interfacing matching interface 52 fitted in known per-se smart card module 50, for establishing bi-directional transfer of the secret share and key that are stored in participant share memory module 54. Smart card 50 is further fitted with a local processor for enhancing the security of data transfer to and from the mains module, all as known per se. The hardware arrangement shown in FIG. 2 is, of course, one of many possible variants and other arrangements, accomplishing the same function, are realizable as is no doubt known to those versed in the art.

Figure 3A:
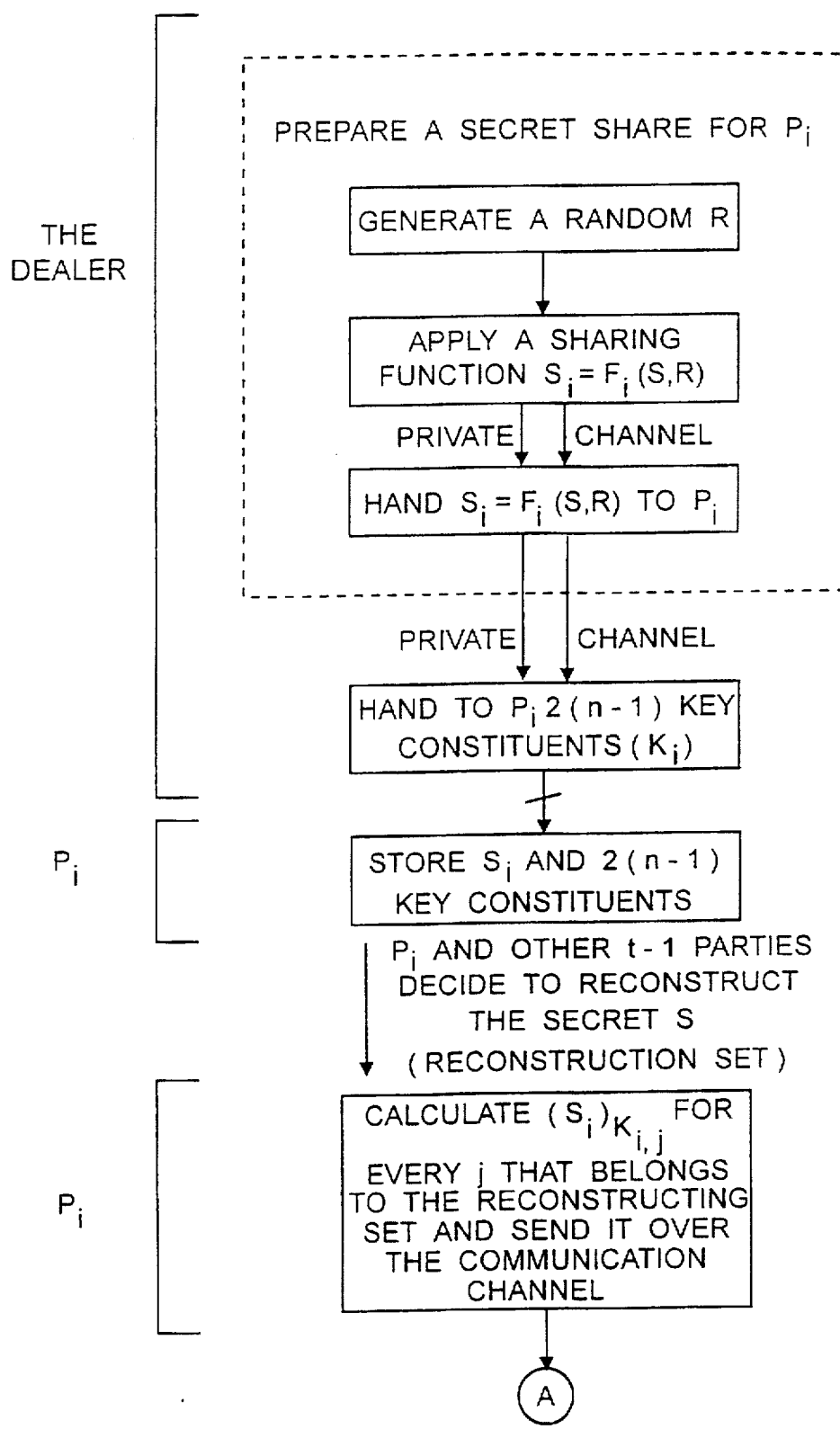
FIG. 3 is a block diagram illustrating the operation of the t-out-of-n secret sharing scheme according to a first embodiment of the invention.
Figure 3:
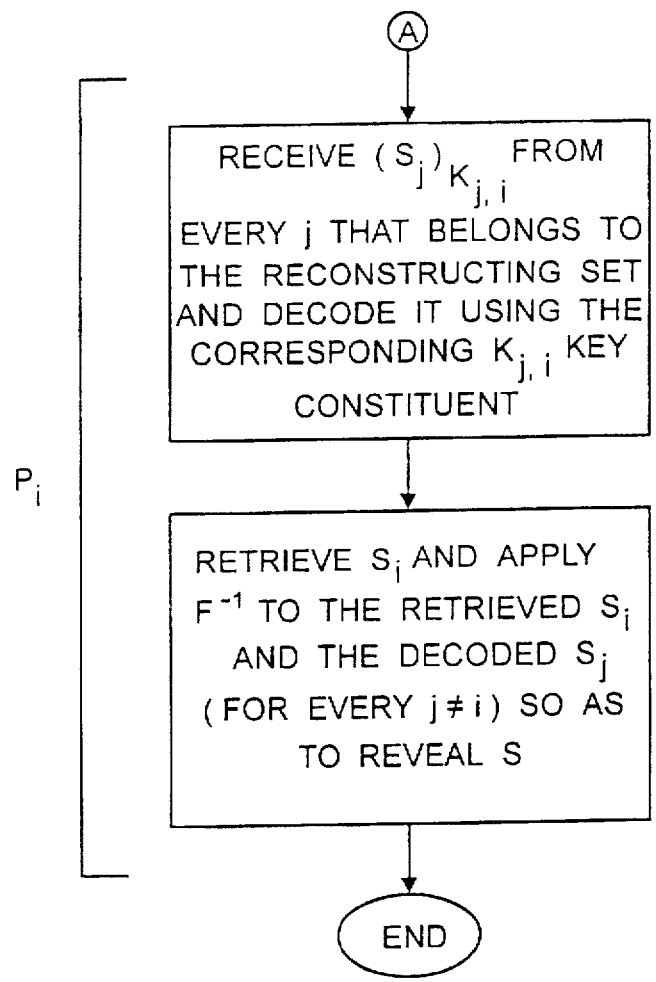

Attention is now directed to FIG. 3 showing a block diagram illustrating the operation of the t-out-of-n secret sharing scheme according to a first embodiment of the invention. It should be noted that the following description focuses on the more general case of P>t, (i.e. a reconstruction set that holds l (l>t) participants) but for illustrative purposes the accompanying FIG. 1 is confined to the specific case of l=t.

Thus, in the t-out-of-n secret sharing scheme, according to the first embodiment of the invention, the size of each participant share is O(n) times the size of the secret. For dealing the secret shares to the n participants, the secret sharing technique that is described in Shamir ibid. is, preferably, utilized.

Shamir presents a traditional scheme in which the size of the shares is the same as the size of the secrets (for domains of secrets which contain at least n+1 secrets). The domain of shares in Shamir's scheme is the smallest possible, since the size of the share has to be at least as large as the size of the secrets. Moreover, and as will be explained in greater detail below, Shamir imposes constraints on the secret size depending upon n and t. A typical secret share generation procedure for a participant $P_i$ (i=1, . . . n), includes:

(1) generate preferably a random (but possibly also a pseudo random) value R;

(2) apply a sharing function $F_i$ on the secret s∈S so as to generate a secret share $s_i$, i.e $s_i=F_i$ (s, R); the size of $s_i$ is the same as the size of s;

(3) deliver securely the secret share $s_i$ to $P_i$, e.g by utilizing a private communication channel. It should be noted that an implicit parameter that is utilized by the sharing function $F_i$ is the value of t, i.e. the number of participant that can jointly reconstruct the secret.

Having distributed the respective secret shares, it is now required, according to the first embodiment of the invention, to deliver, in a secured fashion, to each participant $P_i$ a respective key $k_i$, which as explained in the forgoing consists of 2(n-1) key constituents, i.e. each participant $P_i$ receives a key $k_i$ consisting of a separate key constituent {$P_i$, $P_j$} with respect to each participant (i.e. for every j≠i). Each key constituent {$P_i,P_j$} consists, in turn, of a pair of keys $k_{i,j}$ and $k_{j,i}$ (one-time pads), serving, respectively, for encoding a message transmitted from $P_i$ and for decoding a message received from $P_j$. It should be noted that $P_j$ receives a key constituent {$P_j,P_i$} consisting of the same $k_{j,i}$ and $k_{i,j}$ wherein the former serves for encoding a message transmitted from $P_j$ (which will thereafter be decoded by $P_i$ using the same key $k_{j,i}$) and the latter ($k_{i,j}$) is utilized by $P_j$ for decoding a message received from $P_i$ and which had been encoded by $P_i$ using $k_{i,j}$. Preferably, {$P_i,P_j$} consists of a random one time pad which, by definition, is of the same size as the secret share $s_i$. The keys should also be securely delivered to the respective participants and accordingly the private channel which is used for delivering the secret share may also serve for delivering the keys.

Having dealt the keys, any t out of n participants can decide to reconstruct the secret. Thus, in a typical secret reconstruction scenario the participants of a reconstructing set of size l at least t (i.e. l≧t) decide to reconstruct the secret. To this end, all the participants "send" their shares, in an encoded form, over the public communication channel, to all the remaining l-1 participants.

Each one of the l participants receives the l-1 encoded secret shares from the l-1 sending participants of the reconstructed set and decodes each one of them by utilizing the respective key constituent with respect to the corresponding sending participant, in a manner that will be explained below. Having obtained the secret shares of all the sending l-1 participants of the reconstructing set, each participant can apply a known per se secret reconstruction function (see Shamir, ibid.) to the l-1 decoded secret shares and to the self stored secret share. Put differently, each participant calculates $F^{-1}$ ($s_1$, . . . , $s_l$) so as to reveal the secret. The reconstruction process is now completed since the latter procedure of revealing the secret is executed separately by each member of the reconstructing set.

For a better understanding, a typical sequence of encoding the secret share $s_i$ by $P_i$ for sending it later to $P_j$ will now be described. A similar procedure is, of course, carried out with respect to every $P_j$ that belongs to the reconstructed set (j≠i). Attention is also directed to FIG. 4 which is a flow diagram illustrating the exchange of encoded messages according to the first embodiment of the invention in a 3-out-of-6 secret sharing scheme in which the reconstructing set includes $P_2$, $P_3$ and $P_6$.

Figure 4:
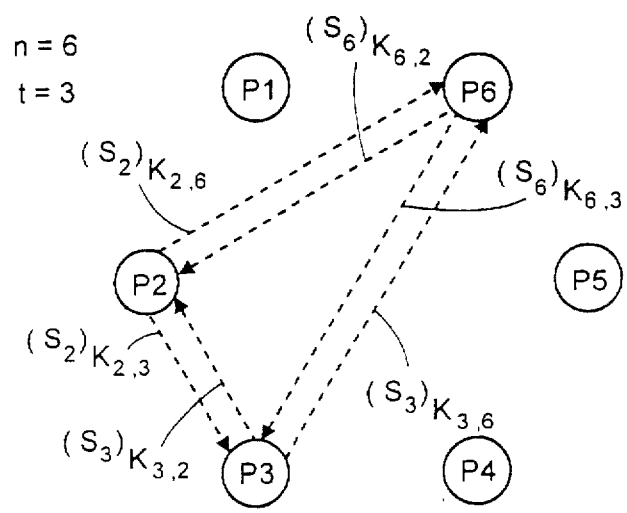
FIG. 4 is a flow diagram illustrating the exchange of encoded messages according to the first embodiment of the invention.

Thus $P_i$ ($P_2$), holding the secret share $s_i$ ($s_2$) from Shamir's scheme, prepares the encoded secret share that is addressed to $P_j$ by modular adding (or xoring) $s_i$ and the first member of the pair {$P_i,P_j$}, i.e. $k_{i,j}$ thereby generating the encoded secret share which is then transmitted over the public communication channel. In FIG. 4, it is shown that $P_2$ encodes $s_2$ by utilizing key constituents $k_{2,6}$ and $k_{2,3}$ with respect to $P_6$ and $P_3$, respectively.

Having received the encoded secret share $s_i$, $P_j$ decodes it by utilizing the same key $k_{i,j}$ which, as specified before, had been distributed also to $P_j$ during the initial dealing procedure. In FIG. 4, $P_6$ decodes $s_2$ using the same key $k_{2,6}$ and by the same token $P_3$ decodes $S_2$ by using $k_{2,3}$.

Due to the fact that only $P_j$ has a matching key $k_{i,j}$ for decoding the encoded secret share $s_i$, other participants listening to the public communication channel can intercept the message but are unable to decode therefrom the secret share $s_i$. The latter characteristic is assured by virtue of the "one time pad" nature of the keys. It is accordingly appreciated that $P_1$, $P_4$ and $P_5$ (taken separately or pairwise), whilst being capable of intercepting the transmitted message over the communication channel are nevertheless unable to decode it since they do not have at their disposal neither $k_{2,3}$ nor $k_{2,6}$.

The second key of the pair {$P_i,P_j$}, i.e. $k_{j,i}$ serves for encoding and decoding the secret share $s_j$ sent from $P_j$ and to $P_i$. The latter is clearly shown in FIG. 4 wherein $s_6$ and $s_3$ are encoded by $P_6$ and $P_3$, respectively, using $k_{6,2}$ and $k_{3,2}$.

Focusing again on $P_i$, he prepares and sends his encoded share to each one of the remaining members of the reconstruction set in a similar manner to that described above, i.e. by employing the first key of the pair $\{P_i,P_k\}$-$k_{i,k}$ for each $P_k$ in the reconstruction set. In reference to FIG. 4, $P_2$ can simply reconstruct the secret s by applying the technique discussed in Shamir ibid. to the self-stored secret share $s_2$ and the decoded secret shares $s_3$ and $s_6$. A similar procedure is carried out by $P_3$ and $P_6$, which eventually results in each participant belonging to the reconstructing set holding the revealed secret whereas the remaining participants ($P_1$, $P_4$ and $P_5$) have no information on the secret.

It should be further noted that since the one-time pads are independent, coalitions of up to t-1 participants, disjoint to the reconstructing set, do not gain any information on the shares, or the secret, by listening to the transmission over the communication channel since they are unable to decode messages which are not specifically addressed thereto. Furthermore, even if many reconstructions took place, no information on the secret or portions thereof can be deduced by the participants of a disjoint set.

Figure 6:
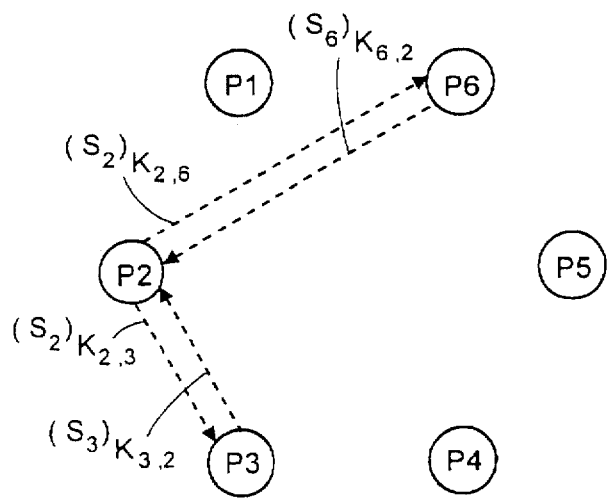
FIG. 6 is a flow diagram illustrating the exchange of encoded messages according to the modified first embodiment of the invention.
Figure 5A:
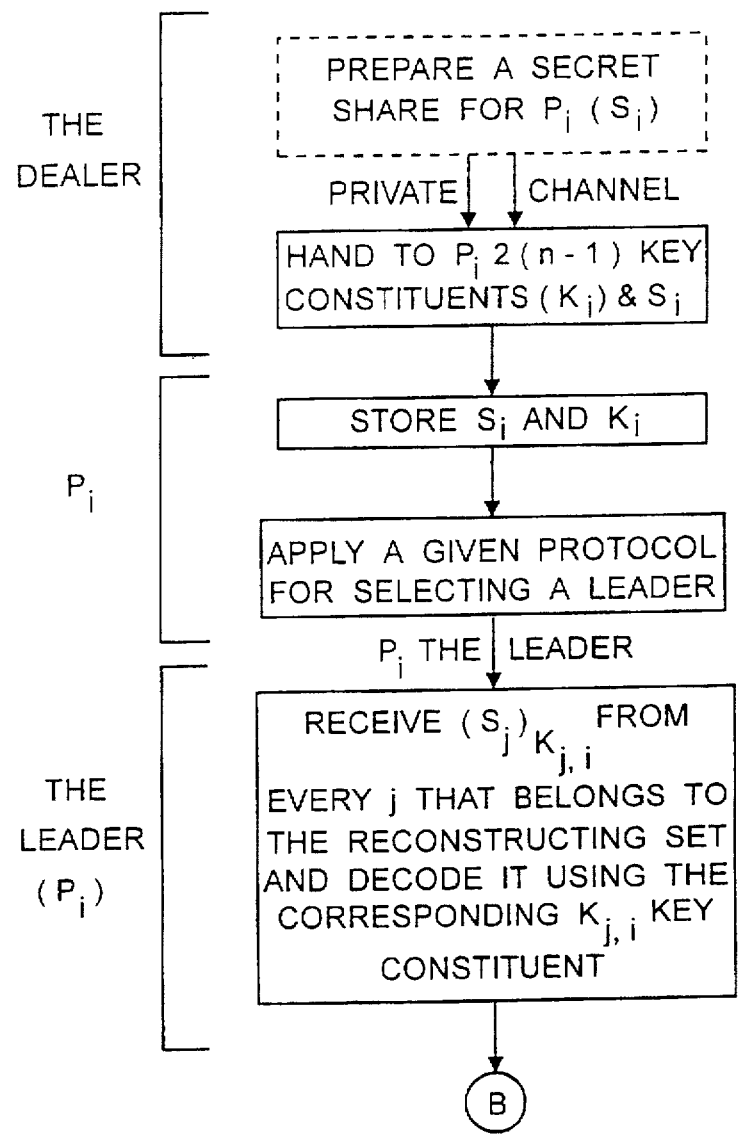
FIG. 5 is a block diagram illustrating the operation of the t-out-of-n secret sharing scheme according to a modified first embodiment of the invention.
Figure 5B:
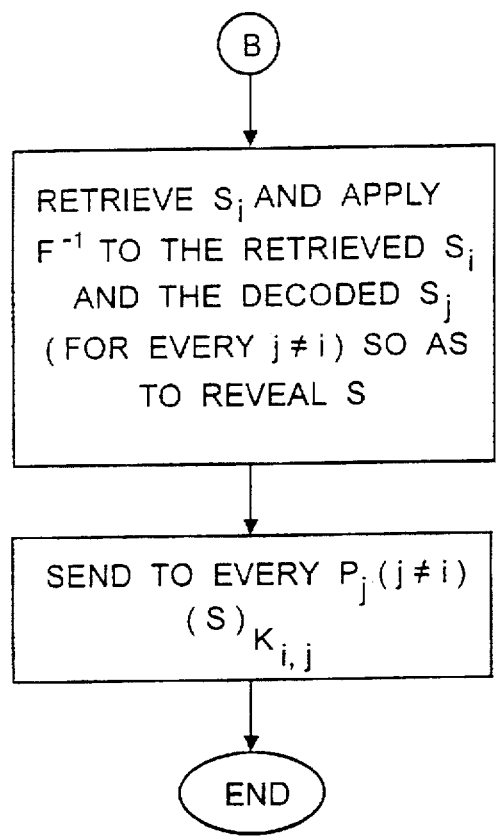

Attention is now directed to FIGS. 5 and 6 showing, respectively a block diagram that illustrates the operation of the t-out-of-n secret sharing scheme according to the modified first embodiment of the invention, and a flow diagram illustrating the exchange of encoded messages in a modified first embodiment of a 3-out-of-6 secret sharing scheme.

The t-out-of-n secret sharing scheme according to the modified first embodiment is very similar to that of the first embodiment except for the fact that the members of the reconstructing set do not send to each other their secret share, but rather one participant of the reconstruction set is selected to be the leader, e.g. the one having the lowest identification index from among the members of the reconstruction set. The other members of the reconstruction set send their secret share to the leader, in a manner described in detail with reference to FIG. 3. In a similar manner to that described in first embodiment, after having received and duly decoded the encoded secret shares from all the participants of the reconstruction set, the leader is capable of reconstructing the secret. As shown in FIG. 6, $P_2$, having the lowest index from among the participants of the reconstructing set, is selected to be the leader. Next, $P_3$ and $P_6$, the remaining members of the reconstructing set, send their respective encoded secret shares over the communication channel. The leader $P_2$ receives them and exploits $k_{3,2}$ and $k_{6,2}$ in order to decode $s_3$ and $s_6$. Having decoded $s_3$ and $s_6$, the leader applies the $F^{-1}$ function, taken from Shamir ibid., to $s_3$ and $s_6$ and the self stored secret share $s_2$ so as to reveal s.

Next, the leader sends to every one of the remaining l-1 participant in the reconstructing set the revealed secret in an encoded form, using to this end the second key of the pair $\{P_{leader},P_k\}$, i.e. $k_{k,leader}$ (wherein "leader" stands for the index of the leader and k ranges over the indices of the remaining l-1 participant). As before, the encoded secret is duly reconstructed by each recipient $P_k$ using to this end the matching second key of the pair $\{P_{leader},P_k\}$ that had been originally distributed thereto. The latter scenario is illustrated in FIG. 6, wherein s is duly encoded by the keys with respect to $P_3$ and $P_6$, i.e. $k_{2,3}$ and $k_{2,6}$ and is sent over the communication channel. $P_3$ and $P_6$ after having received the encoded secret exploit the matching keys respectively (i.e. $k_{2,3}$ and $k_{2,6}$) thereby revealing the secret. As before, any extraneous eavesdropper is unable to decode the secret.

It should be appreciated that owing to the fact that the size of the secret s is the same as that of its portions (shares), then for each participant $P_i$, the size of the key (one time pad) that is used to encode/decode the secret share that it transmits to the leader $P_{leader}$ (i.e. the first key of the pair $\{P_{leader},P_i\}$) is identical to the size of the key that is used to encode/decode the secret that is transmitted back from the leader to $P_j$. Bearing this in mind, and further noting that there is no in-advance knowledge on the identity of the leader (stemming from the fact that there is no in-advance knowledge on the members of the reconstructing set that will eventually reconstruct the secret), it is readily appreciated that exactly as in the above first embodiment, the dealer should deliver to each participant $P_i$ (i=1 ... n), 2(n-1) keys, each of which have a size that equals to the secret size. Hence, the total size of the participant share is O(n) times the size of the secret. Thus, whilst the modified first embodiment does not afford an improved efficiency in terms of the participant share, it constitutes an advantage in terms of reduced communication volume seeing that all participants communicate merely with the leader as opposed to the previous scheme wherein each participant exchanged data with every other participant in the reconstructing set. The reduced communication volume in the modified first embodiment as compared to that of the first embodiment is clearly evident when referring to FIGS. 4 and 6. Thus, whilst in FIG. 4 the total communication volume amounts to 6 separate communications, in FIG. 6 it amounts to only 4.

In the modified first embodiment, communication is effected only with the leader, i.e. the keys adapted for communication between the leader and the remaining participants are exploited, whereas all the remaining keys remain unused. Put differently, all the keys that have been delivered to each participant for communicating with any other possible participant, had he been selected to be the leader, remain unused. This limitation poses undue constraint in terms of the relatively large size of each participant share, and the second embodiment of the invention that is described below copes with this drawback.

Figure 7A:
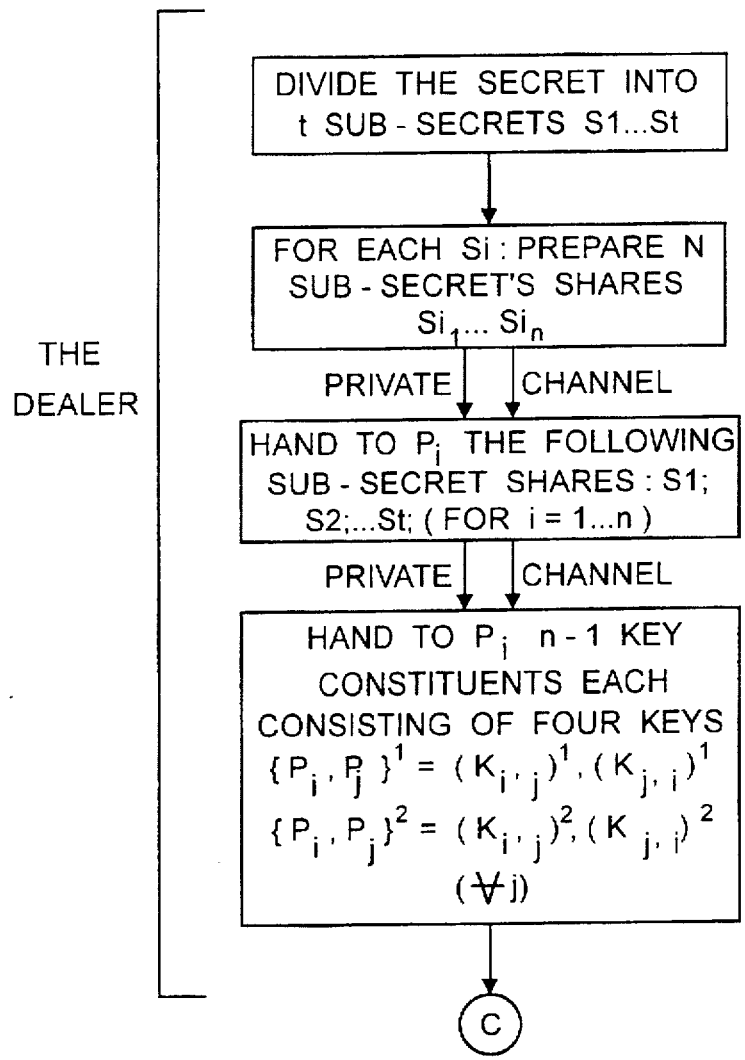
FIG. 7A–C is a block diagram illustrating the operation of the t-out-of-n secret sharing scheme according to a second embodiment of the invention.
Figure 7B:
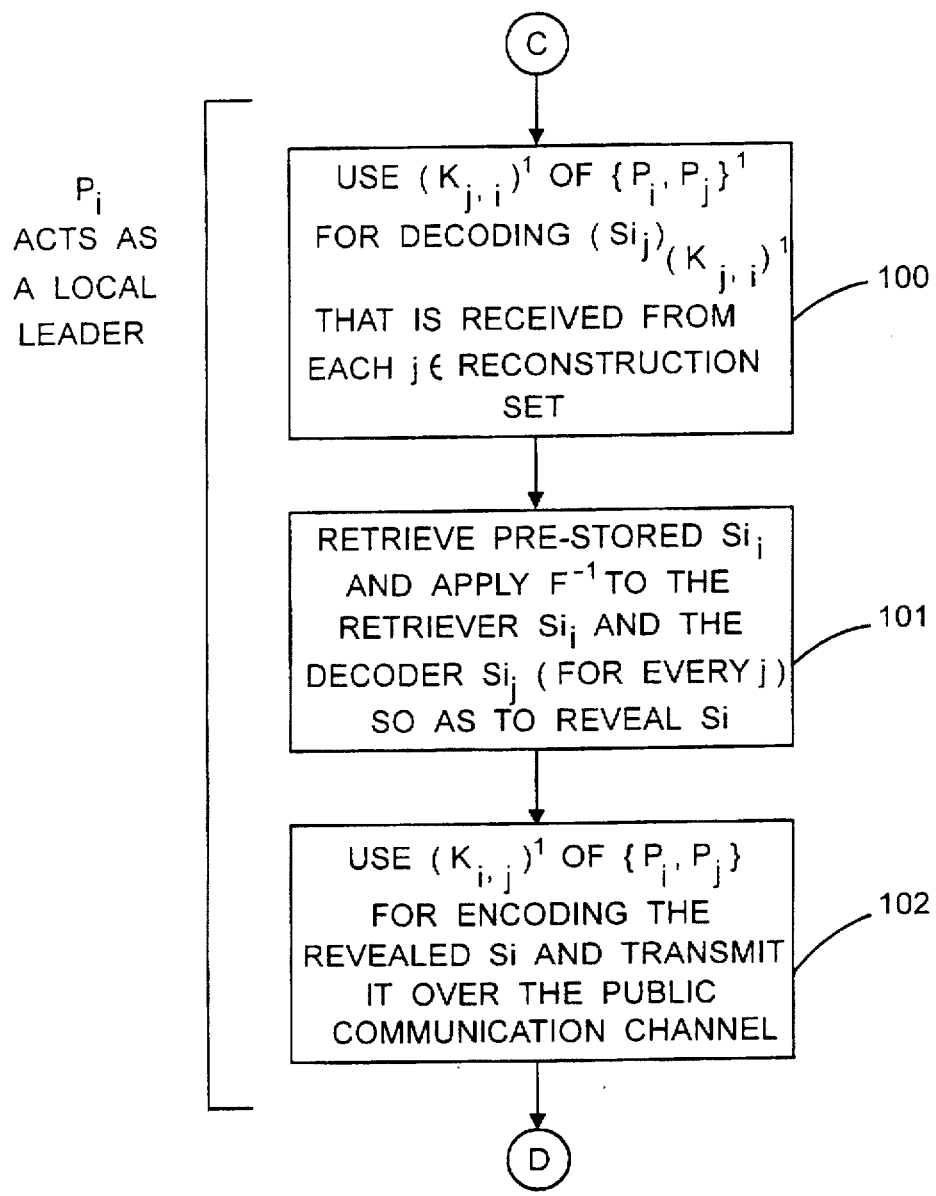
Figure 7C:
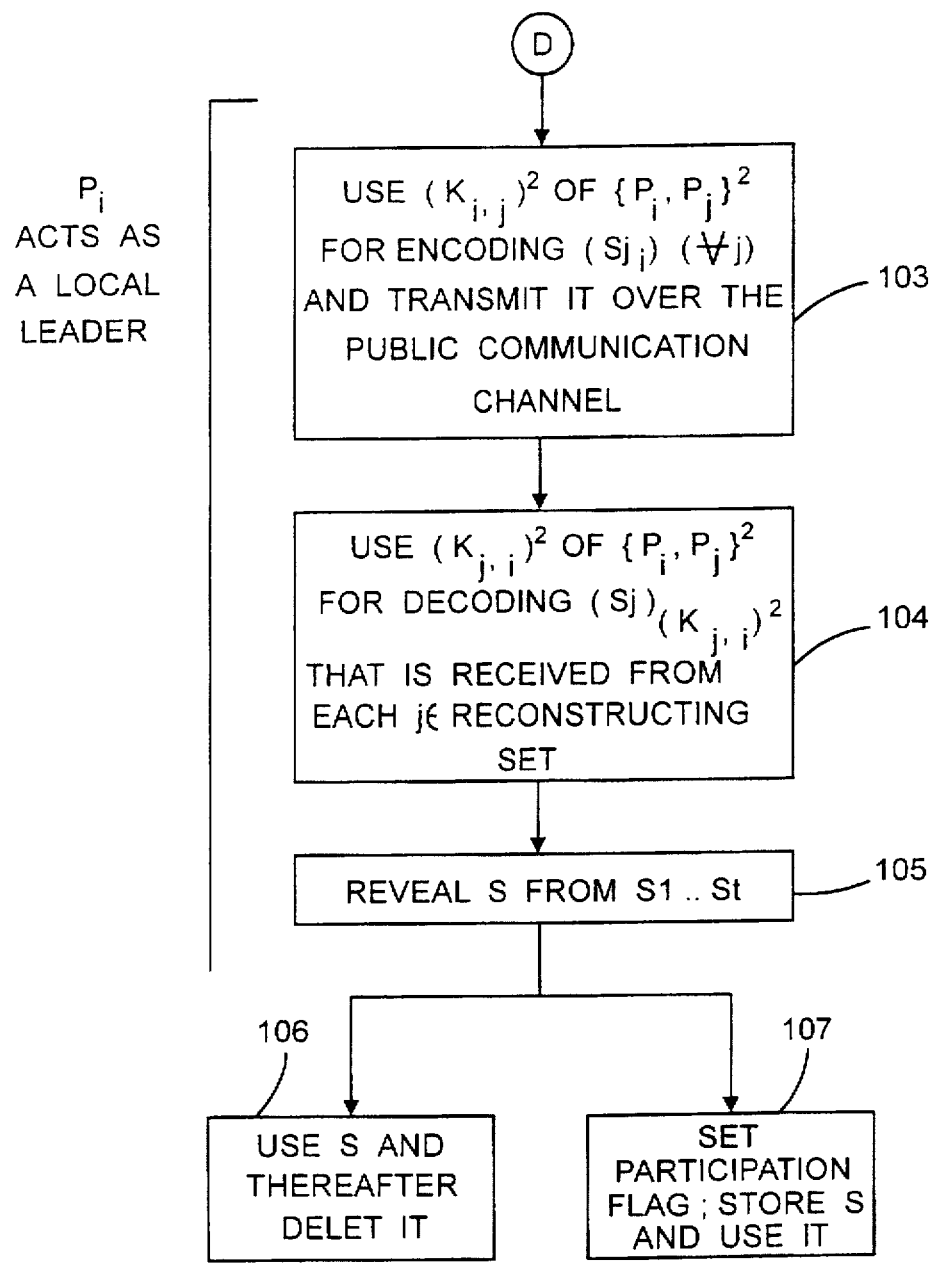

Reference is made to FIGS. 7A–C (which, for simplicity will be referred to as FIG. 7). FIG. 7 shows a block diagram of the operation of the t-out-of-n secret sharing scheme according to a second embodiment of the invention. By this embodiment the dealer divides the secret s into t sub secrets s1 ... st, with the size of each being t times smaller than that of the original secret s, e.g. by simply partitioning s to t non-overlapping sub secrets s1 ... st.

Thereafter, each of the sub-secrets is partitioned into n shares by following the technique described in Shamir ibid., e.g. $s1_1, s1_2, \ldots s1_n$ standing for the n shares of the first sub-secret s1. (in the following, $si_j$ signifies the $j^{th}$ share of the sub secret i which is delivered to $P_j$; put differently, the first index i stands for the sub-secret #i and the second index j stands for share #j thereof, that is delivered to participant $P_j$). Naturally, the size of each share is equal to that of the sub-secret, i.e. t times smaller than the original secret s.

Reverting now to the second embodiment of the invention, the sub-secret shares are thereafter delivered privately to the n participants exactly as in the first embodiment with the result the $i^{th}$ participant (i=1,2, ... n) receives the following sub-secret shares $s1_i, s2_i, \ldots st_i$. As will be explained in greater detail below, there follows a stage of privately delivering a key ki to each participant $P_i$ (i=1 ... n).

Having duly received their secret shares and keys, a set of t participants that decide to reconstruct the secret commence the secret reconstruction sequence. Each participant will act as the leader in the previous scheme but as opposed to the latter wherein one leader (a global leader) was responsible for reconstructing the entire secret, in accordance with the second embodiment each one of the t leaders (referred to also as t local leaders) is responsible for reconstructing a respective sub-secret.

The reconstructing process effected by each local dealer is exactly as before. Thus, for example, $P_1$ (being a local leader) is responsible for the reconstruction of sub-secret s1, and to this end he receives from the remaining t-1 participants their respective t-1 shares (i.e. $S1_2, S1_3 \ldots S1_t$), obviously in an encoded form. Having duly received the t-1 shares of the sub secret s1, $P_1$ decodes them in the same manner as the previous embodiment, i.e. utilizing the decoding keys with respect to the t-1 participants, respectively. Next, $P_1$ utilizes his own sub secret share $s1_1$ along with the remaining t-1 sub secret shares ($s1_2, S1_3 \ldots s1_t$) for reconstructing the sub-secret s1 using, to this end, the technique described in Shamir ibid.

The above procedure is executed by each local leader $P_i$ in the reconstructing set with respect to his own sub-secret si giving rise to the reconstruction of each sub-secret by its corresponding local leader.

All that remains to be done is to distribute the reconstructed sub-secrets among the members of the reconstructing sets (obviously in an encoded form) in order to reconstruct the secret s. Thus, $P_1$ receives from the remaining members of the reconstructing set $P_2 \ldots P_t$ their respective sub secrets s2 . . . st (obviously in an encoded form) and after decoding them he reconstructs the secret s by simply concatenating them.

The key distribution and usage scheme is similar to that described with reference to the previous embodiment in the sense that each local leader acts essentially in the same manner as the global leader in the previous scheme.

For illustrative purposes, there follows a description of the communication between $P_i$ and one participant ($P_j$) from among the members of the reconstructing set which terminates when the local leader $P_i$ manages to reconstruct the sub-secret si. The symmetric situation wherein $P_j$ plays the role of local leader and $P_i$ plays the role of one participant of the reconstructing set, for the purpose of reconstructing the sub-secret sj, is also described. Thus, $P_i$ receives four keys $\{P_i, P_j\}^1$ and $\{P_i, P_j\}^2$, wherein the former holds two keys, $(k_{j,i})^1$ and $(k_{i,j})^1$, which as will be explained in greater detail below serve for the bi-directional communication between i and j for the purpose of reconstructing the sub-secret si by $P_i$, and to this end, $P_j$ also holds $\{P_i,P_j\}^1$ that consists of the same keys $(k_{j,i})^1$ and $(k_{i,j})^1$. $\{P_i,P_j\}^2$ that are held by $P_j$ consists of $(k_{i,j})^2$ and $(k_{j,i})^2$ which as will be explained in greater detail below will serve for the bi-directional communication between and j for the purpose of reconstructing the sub-secret sj by $P_j$ and to this end $P_i$ also holds $\{P_i,P_j\}^2$ having the same keys $(k_{j,i})^2$ and $(k_{i,j})^2$.

Focusing, at first on $\{P_i, P_j\}^1$, it consists as specified two keys the first of which $(k_{i,j})^1$ serves for encoding the sub-secret share $sj_i$ by $P_i$ and for decoding it by $P_j$ (obviously after $P_i$ has transmitted it over the public communication channel and $P_j$ has duly received it). Having received and decoded $sj_i$ for all i in the reconstruction set, $P_j$ is able to reconstruct the secret share sj in the manner described in the foregoing. Similarly, $P_j$ uses the second key of the pair i.e. $(k_{j,i})^1$ for encoding the reconstructed sub-secret sj which is thereafter decoded by $P_i$, using the same key, $(k_{j,i})^1$ (again, after $P_j$ has transmitted it over the public communication channel and $P_i$ has duly received it).

In a similar manner, $\{Pi, P_j\}^2$, holds two keys, the first of which $(k_{j,i})^2$ serves for encoding the sub-secret share $si_j$ by $P_j$ and for decoding it by $P_i$ (obviously after $P_j$ has transmitted it over the public communication channel and $P_i$ has duly received it), and the second key in the pair $(k_{i,j})^2$ serves for encoding the reconstructed sub-secret si and for decoding it by $P_j$ (again, after $P_i$ has transmitted it over the public communication channel and $P_j$ has duly received it).

Accordingly, each participant holds four keys with respect to each one of the remaining n-1 local leaders, i.e a total of 4(n-1) keys. (It is recalled the there is no a priori knowledge of the identity of the reconstructing set, and therefore the keys distributed to the participants should accommodate any possible reconstructing set). In addition, each of the participants holds a single share with respect to each one of the sub secrets, i.e. t shares.

As the size of each sub-secret share is (s/t), and further bearing in mind that each key size is the same as that of the secret share that it is adapted to encode or decode, it arises that the resultant participant share is:

$$\frac{4 \cdot (n-1) + t}{t}$$

times the original secret size.

It is accordingly appreciated that the size of each participant's share is O(n/t) times the size of the secret which is a significant improvement over the previous embodiments. The complexity of communication in terms of communication volume is essentially the same as that of the first embodiment of the invention, simply since, on the one hand the number of the messages increases and on the other hand they are shorter in length. It should be noted that in some exceptional scenarios the latter observation does not hold as will explained in greater detail below.

Whilst, for sake of clarity of explanation, in the above description $P_j$ was always responsible for the reconstruction of the sub secret sj, it should be appreciated that, in reality, no constraint is imposed as regards which participant will reconstruct which sub-secret.

Figure 8:
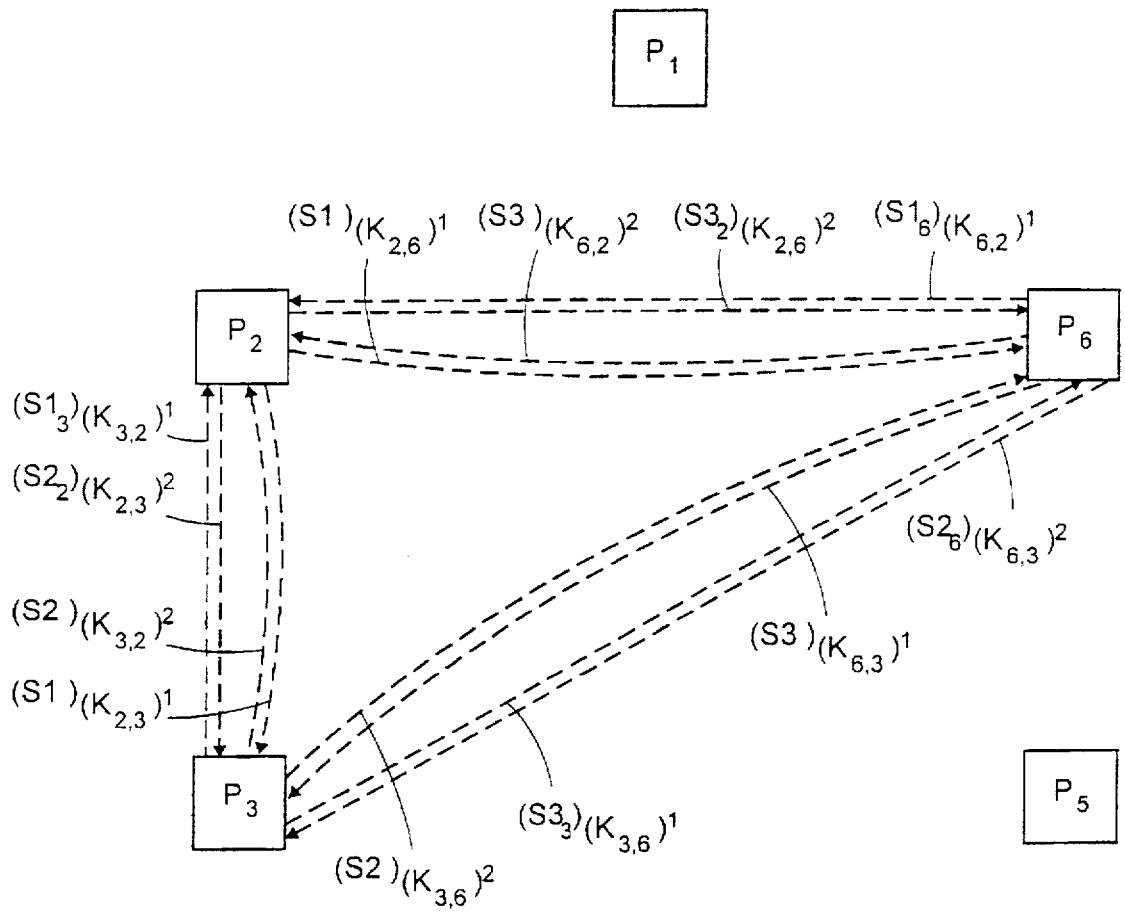
FIG. 8 is a flow diagram illustrating the exchange of encoded messages according to the second and third embodiments of the invention.

A specific illustrative flow diagram exemplifying the exchange of encoded messages according to the second embodiment of the invention, is given in FIG. 8. The example in FIG. 8 concerns 6 participants of which $P_2$, $P_3$ and $P_6$ decide to reconstruct the secret. The table at the bottom of FIG. 8 elaborates the secret shares that had been delivered to each participant by the dealer. By this specific example, $P_2$ is a local leader responsible for the reconstruction of sub secret s1 and likewise $P_3$ and $P_6$ are responsible for reconstructing the sub secrets s2 and s3 respectively. As shown, $P_6$ sends $s1_6$ (after having been encoded by $(k_{6,2})^1$) to $P_2$. The latter also receives $S1_3$ (after having been encoded by $(k_{3,2})^1$) from $P_3$. $P_2$ decodes $s1_6$ by utilizing $(k_{6,2})^1$ and $s1_3$ by utilizing $(k_{3,2})^1$). Thereafter $P_2$ is capable of reconstructing s1 by applying $F^{-1}$, taken from Shamir ibid., to the decoded $s1_6$ and $s1_3$ as well as to the self stored $s1_2$ so as to reconstruct the sub secret s1 (in this connection it is recalled that 3 sub-secret shares are sufficient to reconstruct the each sub secret). Having revealed s1, $P_2$ sends s1 to $P_3$ and $P_6$ after encoding it, using to this end $(k_{2,3})^1$ and $(k_{2,6})^1$, respectively.

$P_2$ also sends $s2_2$ to $P_3$ (in an encoded form, using $(k_{2,3})^2$) and $s3_2$ to $P_6$ (in an encoded form, using $(k_{2,6})^2$). $P_3$, after having received from $P_2$ and $P_6$ their respective encoded sub-secret shares is capable of reconstructing the sub-secret s2 and in a similar manner $P_6$ is capable of reconstructing s3. Accordingly, $P_3$ and $P_6$ send to $P_2$ their sub secrets s2 and s3 in an encoded form, using to this end $(k_{3,2})^2$ and $(k_{6,2})^2$, respectively.

$P_2$ is, of course capable of decoding $s_2$ and $s_3$ by using $(k_{3,2})^2$ and $(k_{6,2})^2$ respectively, and is thereafter capable of revealing the secret s by simply applying a concatenation function to the sub secrets s1, s2 and s3.

The unrestricted nature of the present embodiment may lead to undesired scenarios as will be explained below.

Consider, for example, a 3 out of 4 secret sharing scheme (i.e. n=4, t=3) with 3 sub secrets s1, s2 and s3. In a first reconstruction phase $P_1$, $P_2$ and $P_3$ reconstitute, respectively s1, s2 and s3 (i.e. the identity between the respective indices is retained), and therefrom the secret s. In a subsequent reconstruction phase $P_2$, $P_3$ and $P_4$ may gather for the purpose of reconstruct s1, s2 and s3, respectively (wherein the identity between the respective indices is not retained).

The latter example demonstrates the unrestricted nature of the scheme according to the second embodiment i.e. the secret may be repeatedly reconstructed by different reconstructing sets. Nevertheless, and as is well known, in order not to degrade the second level security attribute of the scheme according to the second embodiment, one should assure that under no circumstances should a given key (one-time-pad) be used by $P_i$ vis-a-vis the same participant $P_j$ for encoding two or more different messages. (It should be noted, in this connection, that a given one-time-pad is allowed to be used more than once without adversely affecting the perfectness attribute of the scheme only in the exceptional case wherein it is reused for encoding the same message. The undesired situation of encoding different messages with a given one-time-pad may arise in the example given above, wherein the first reconstructing phase (in which $P_1$, $P_2$ and $P_3$ participate), $P_2$ sends to $P_3$ the $s3_2$ sub-secret share (i.e. the share of sub-secret s3 held by $P_2$) after encoding it by $(k_{2,3})^1$ - i.e the first out of four one-time-pads that $P_i$ holds with respect to $P_j$. After following the procedure as described in detail above in which the remaining three keys have been exploited, $P_1$, $P_2$ and $P_3$ hold, each, the reconstructed secret s.

In the case that parties that have just reconstructed the secret participate in successive reconstructions, they will not receive any messages from mating participants, however, they will send messages according to the specified protocol, i.e. secret share and/or sub secret all as required and appropriate Suppose that later on, $P_2$, $P_3$ and $P_4$ decide to reconstruct the secret (e.g. for executing another privileged financial transaction), and further assuming, as specified in the foregoing, that $P_2$ and $P_3$ deleted any trace of the secret which they had revealed in the first phase, it would be appreciated that following, straightforwardly, the procedure described above leads necessarily to the undesired exploitation of the same key with respect to two different messages. Specifically, in the previous reconstruction phase, $P_2$ had sent to $P_3$ the $s3_2$ sub-secret share i.e. using to this end the encoding key $(k_{2,3})^1$. In the present reconstruction phase, $P_2$ sends to $P_3$ the $s2_2$ sub-secret share (since in this scenario, $P_3$ is responsible for reconstructing the second secret share, as opposed to the third in the previous embodiment) using to this end the same $(k_{2,3})^1$ one time pad. Put differently, $P_2$ used the same one-time-pad $(k_{2,3})^1$ with respect to two different secret shares (vis-a-vis the same recipient $P_3$) leading thus to the inevitable consequence that the t-out-of-n secret sharing scheme is rendered unsecured.

In order to cope with the latter shortcomings, the communication protocol, in accordance with the second embodiment, is slightly altered (referred to as first modification) in the sense that each participant sets a so called "participation flag" which is accessible to all other participants and which signifies that he had, at least once, participated in a secret reconstruction session (see block 107 in FIG. 7). Henceforth, each participant in a reconstructing set will encode his secret share only with respect to those participants having their participation flag reset, thereby avoiding the risk of using the same key twice with respect to two different messages, (i.e. block 101 and 104 are modified to send the encoded data only to those recipients having their participation flag reset). The protocol according to the latter modified embodiment assures that any participant which had not participated in the past receives encoded secret shares from all the members of the reconstructing set, enabling him, thus, to reconstruct the secret. Applying this modification to the example given above, results in that $P_1$ $P_2$ and $P_3$ set their participation flags after the first phase of the secret reconstruction sequence terminates. In the second phase (where $P_2$ $P_3$ and $P_4$ participate) $P_2$ does not send to $P_3$ any data (since the participation flag of the latter is set) and the undesired scenario described above is avoided. In this second phase, $P_2$ and $P_3$ nevertheless send their respective shares to $P_4$ which is capable each of reconstructing the secret s.

Since the parties that participated in previous secret reconstruction have not deleted the secret after reconstruction, the step of sending them the reconstructed secret in future secret reconstructions (in which they participate) is, of course, obviated.

It is accordingly appreciated that according to the second modified embodiment described above each key constituent is used at most once, thereby retaining the perfectness attribute of the t-out-of-n secret sharing scheme of the invention.

Turning now to the third embodiment, it concerns a one-time t-out-of-n secret sharing scheme in which exactly t-out-of-n members reconstruct the secret. Put differently, after using the scheme once, subsequent reconstruction sessions render the scheme unsecured. As will be appreciated below, the main advantage associated with this embodiment is the further reduction in the size of the key held by each participant to only one tenth of the original secret size, regardless of the values of t and or n, or in other words O(1) times the size of the secret.

The t-out-of-n secret sharing scheme according to the third embodiment is very similar to that described with reference to the second embodiment (and illustrated in FIGS. 7 and 8), in the sense that the secret is divided into t sub secrets and the t members that participate in the secret reconstruction phase act, each, as a local leader for the purpose of reconstructing the sub-secret. However, as opposed to the second embodiment wherein each participant received random (or possibly pseudo random) 4(n-1) key constituents which were independent one with respect to the other (block 110 in FIG. 7), in the third embodiment, due to its one-time nature, reduced independent requirements may be tolerated. Thus, in the third embodiment the dealer replaces the action illustrated in block 110 by a modified action in which he generates and delivers to each participant a so called "generation key". Next, each one of the t members that participates in the reconstruction set exploits the generation key for producing the 4(t-1) key constituents (with respect to the remaining t-1 members of the reconstruction set), using to this end, for example the key distribution system described in R. Bloom, "An Optimal Class of Symmetric Key Generation Systems", In T. Beth, N. Cot, and I. Ingemarsson, editors, *Advances in Cryptology - Proceeding of Eurocrypt* 84, volume 209 of *Lecture Notes in Computer Science*, pages 335–338. Springer-Verlag, 1984.

The following steps, illustrated in blocks 100–108 and in FIG. 8, apply also to the third embodiment.

As clearly follows from Bloom ibid., each participant receives a different generation key. However, the latter are produced such that every $P_i$ and $P_j$ that belong to the reconstructing set are capable of reconstructing from the respective generation keys the same four key constituents, i.e $(k_{j,i})^1$, $(k_{i,j})^1$, $(k_{i,j})^2$ and $(k_{j,i})^2$ in order to enable communication between them. As is known to those versed in the art, it clearly follows from Bloom ibid. that any coalition of less than or equal to t-1 parties has no information on the keys (or the relations therebetween) that are held by $P_i$ and $P_j$ (for every i and j that belong to a reconstruction set of size t). However such a coalition may get at least partial information for reconstructing set larger than t. Accordingly, the perfectness attribute of the system is retained for a reconstructing set of exactly t members. The technique according to Bloom ibid. is associated with a parameter (e.g. in the example below 2t-3) which prescribes the size of the coalition that will have no information about the keys as explained above.

Obviously, each participant has to store only the generation key, and the 4(t-1) keys generated therefrom, on the fly, during the secret reconstruction session.

The generation of key constituents according to the technique described in Bloom ibid., complies with the security requirements of t-out-of-n secret sharing scheme, i.e. any disjoined coalition of at most t-1 members will be unable to reconstruct the secret, provided however that only one secret reconstruction sequence occurs. It should be noted that, normally, a generation key depends on the value t and accordingly a reconstruction set of size $t_1$ is associated with a different generation key than a reconstruction set of size $t_2$.

Moving now to the modified third embodiment, it concerns a one-time secret reconstruction scheme of at least t members from among the n members as opposed to exactly t in the previous embodiment. As specified in the foregoing whilst minimally t members are capable of reconstructing the secret, there are situations where more than t members are interested in the secret. It should be noted that the fact that t members are capable of reconstructing the secret does not necessarily entail that more than t members are capable to do the same as is clearly evident from the one time exactly t-out-of-n scheme according to the third embodiment of the invention. In the latter, after the t members have reconstructed the secret they cannot distribute it (obviously in an encoded form) to other members over the public communication channel, since they have already exploited all their encoding keys with respect to the t-1 members of the reconstructing set.

Figure 9:
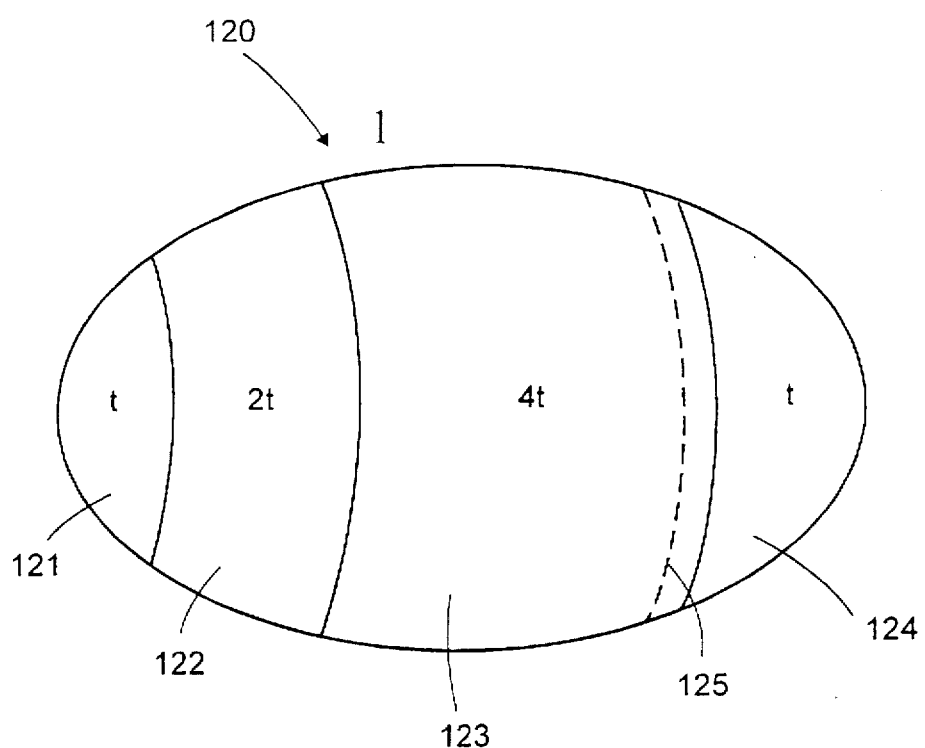
FIG. 9 shows schematically how a set of n participants is partitioned to subsets, according to a modified third embodiment of the invention.

Reverting now to the modified third embodiment, and as shown in FIG. 9, the set of n participants is divided into approximately log(l/t) disjoint sets i.e. sub-sets of size t,2t . . .$2^i t \leq 1$ and possibly an additional subset of size t which may overlap one of the previous sets (in the case that n is not an integer multiplication of t). The total number of sets is thus at most 2+log(l/t). In FIG. 9 there is shown a set of n participants (120) partitioned into four subsets t,2t,4t and t (121–124, respectively), with the latter partially overlapping subset set 123 as indicated by dashed line 125.

Thus, for example, if l=21 and t=3 the four sub-sets are of sizes 3,3,6,12 respectively for "covering" the 21 participants. The same partition of sub sets applies for example for l=18 or 19. As will be explained below, the membership of participants in the various sub-systems is a priori unknown and only during the reconstruction sequence is a given participant, that is member in a reconstructing set, actually assigned to one of the sub-sets.

The underlying idea behind the partition of l into at most 2+log(l/t) sub-sets is to allow any of the sub-sets to independently reconstruct the secret in the same manner as the previous exactly t-out-of-n scheme (i.e. as described with reference to FIGS. 7 and 8) requiring, thus, a participant share of only O(1) times the size of the secret.

During operation, when the participants of a reconstructing set of size l (l>t) decide to reconstruct the secret, they are divided into disjoint subsets (and possible one joined set), i.e. the first subset holding t members, the second subset holding 2t members, etc., until every member of the reconstructing set belongs to at least one of the sub-sets, (of course, the latter procedure does not necessarily imply that all the sub sets have been used). Having divided the participants into subsets, the members of each subset reconstruct separately the secret as if it was an exactly t-out-of-n one time secret sharing scheme, which eventually results in revealing the secret by each one of the l participants. By "separately" it is meant that the reconstruction phase involves only intra-communication in the subsets whilst avoiding any inter-communication between the subsets.

Each member in a given subset utilizes a generation key of size O(1) for generating the keys with respect to the remaining participants in the subset.

As specified, there is no a priori knowledge of the actual assignment of the participants to the various sub-sets, i.e. a given participant may be assigned in one reconstruction scenario to a subset of size t and in a different reconstruction scenario to a subset of size 4t. Accordingly, the dealer should accommodate any possible situation and therefore deliver to each participant a separate generation key for each possible subset. The participant share according to the modified third embodiment of the invention is, about log(n/t) generation keys plus the respective secret share, i.e. O(log(n/t)) times the size of the secret.

Regardless of the embodiment under consideration, the use of the secret sharing scheme as described in Shamir ibid. poses constraints on the secret size, i.e. the secret size should exceed a given threshold. More specifically, the basic restriction is that in the technique according to Shamir ibid. the size of the secret m (m standing for the length of the secret in bits) has to be at least the logarithm of the number of participants, namely log n. The same holds true also for every sub-secret used in the second, third and modified third embodiments. Thus, if the secret is partitioned to t sub-secrets, each has to be of size at least log n which results in a secret size of at least t log n. The latter stipulations pose the following constraints on the participant share:

| t-OUT-OF-n SECRET SHARING SCHEME: | PARTICIPANT SHARE |
|---|---|
| UNRESTRICTED WITH NO LEADERS (first embodiment) | (2n–1) max{m, log n} |
| UNRESTRICTED WITH LEADERS (modified first embodiment) | (2n–1) max{m, log n} |
| UNRESTRICTED (second embodiment) | (t+4(n–1)) max{m/t, log n} |
| ONE TIME SCHEME FOR EXACTLY t Participants (third embodiment) | 9 max {m+t, t log n} |
| ONE TIME SCHEME FOR AT LEAST t Participants (modified third embodiment) | 10(log(n/t)+2) max{m+n, n log n} |

For illustrative purposes, two specific examples are given below:

| n = 1024, t = 128 | | |
|---|---|---|
| t-out-of-n SECRET SHARING SCHEME: | LENGTH OF SECRET | LENGTH OF PARTICIPANT SHARE (times secret length) |
| UNRESTRICTED WITH NO LEADERS (first embodiment) | at least 10 bits | 1024 |
| UNRESTRICTED (second embodiment) | at least 1280 bits | 33 |
| ONE TIME SCHEME FOR EXACTLY t Participants (third embodiment) | at least 1,280 bits | 10 |
| ONE TIME SCHEME FOR AT LEAST t Participants (modified third embodiment) | at least 10,240 bits | 40 |

| n = 1024, t = 8 | | |
|---|---|---|
| t-out-of-n SECRET SHARING SCHEME: | LENGTH OF SECRET | LENGTH OF PARTICIPANT SHARE (times secret length) |
| UNRESTRICTED WITH NO LEADERS (first embodiment) | at least 10 bits | 1024 |
| UNRESTRICTED (second embodiment) | at least 80 bits | 513 |
| ONE TIME SCHEME FOR EXACTLY t Participants (third embodiment) | at least 80 bits | 10 |
| ONE TIME SCHEME FOR AT LEAST t Participants (modified third embodiment) | at least 10,240 bits | 80 |

We claim:

1. A method for reconstructing a secret, over a public communication channel, using a perfect t-out-of-n secret sharing scheme; the t-out-of-n secret sharing scheme having a dealer which utilizes a delivering procedure for privately delivering n secret shares of said secret along with n keys to respective n participants that are interlinked by said public communication channel; the key that is delivered to each one of said n participants is composed of, or is serving for generating n-1 key constituents for respectively communicating, over said public communication channel, with the remaining n-1 participants from among said n participants;

said secret sharing scheme further having a secret reconstructing procedure for being executed by each one of at least one recipient participant selected from a group of l participants from among said n participants, for reconstructing said secret by utilizing self secret share of said recipient participant and l-1 secret shares of the remaining l-1 participants from among said l participants;

said secret reconstructing procedure, executed by each one of said recipient participants, comprising the following steps:

(i) receiving over said public communication channel l-1 encoded secret shares from the l-1 participants, respectively; the l-1 encoded secret shares being generated, each, by one and different participant from among said l-1 participants, by applying an encoding function which utilizes a key constituent from among said n-1 key constituents that is adapted for communicating between said one participant and said recipient participant;

(ii) decoding each one of said l-1 encoded secret shares, thereby obtaining l-1 decoded secret shares; the l-1 decoded secret share are obtained, each, by applying a decoding function that utilizes said key constituent, stipulated in step (i), that is adapted for communication between said one participant and said recipient participant; and (iii) reconstructing said secret from the l-1 decoded secret shares and from the self secret share of the recipient participant.

2. A method according to claim 1 wherein said n participants are further interlinked by means of private communication channel and wherein said delivering procedure is executed over said private communication channel.

3. A method according to claim 2, wherein said delivering procedure employs a Shamir technique.

4. A method according to claim 2, wherein said delivering procedure employs a Blakely technique.

5. A method according to claim 1, wherein the size of the secret share equals the size of the secret.

6. A method according to claim 1, wherein said secret reconstructing procedure is executed by exactly one recipient participant selected from the group of said l participants, and wherein said secret reconstructing procedure executed by the recipient participant further comprising the step of:

(iv) transmitting over said public communication channel l-1 encoded messages to the l-1 participants, respectively; the l-1 encoded messages being generated, each, by applying to said secret an encoding function which utilizes a key constituent from among said n-1 key constituents that is adapted for communication between one and different participant, from among said l-1 participants, and said recipient participant; and for executing by each one of said l-1 participants:

(v) receiving over said public communication channel, an encoded message from among said l-1 encoded messages and decoding it so as to obtain a decoded secret; the decoded secret is obtained by applying to the encoded message a decoding function that utilizes the key constituent stipulated in step (iv) that is adapted for communication between one and different participant and said recipient participant.

7. A method according to claim 1, wherein each one of said l participants constitutes said recipient participant.

8. A method for reconstructing a secret, over a public communication channel, using a perfect t-out-of-n secret sharing scheme; the t-out-of-n secret sharing scheme having a dealer capable of partitioning said secret to t sub-secrets each of which being subjected to a delivering procedure for privately delivering n sub secret shares thereof to respective n participants that are interlinked by said public communication channel; said dealer is further capable of privately delivering n keys to the respective n participants; the key that is delivered to each one of said n participants is composed of, or is serving for generating, n-1 key constituents for respectively communicating, over said public communication channel, with the remaining n-1 participants from among said n participants;

said secret sharing scheme further having a secret reconstructing procedure for being executed by each one of l participants (l≧t), constituting, respectively, l recipient participants, from among said n participants, for reconstructing said secret by utilizing a self secret share of said recipient participant and l-1 secret shares of the remaining l-1 participants from among said l participants;

said secret reconstructing procedure, executed by each one of t participants from among said l recipient participants, comprising the following steps:
  (i) receiving over said public communication channel t-1 encoded sub secret shares from the remaining t-1 participants, from among said t participants; the t-1 encoded sub secret shares being generated, each, by one and different participant from among said t-1 participants, by applying to said sub secret share an encoding function which utilizes a key constituent from among said n-1 key constituents that is adapted for communicating between said one participant and said recipient participant;
  (ii) decoding each one of said t-1 encoded sub secret shares, thereby obtaining t-1 decoded sub secret shares; the t-1 decoded sub secret shares are obtained, each, by applying thereto a decoding function that utilizes said key constituent, stipulated in step (i), that is adapted for communication between said one participant and said recipient participant;
  (iii) reconstructing said sub secret from the t-1 decoded sub secret shares and from the sub secret share of the recipient participant; said secret reconstructing procedure, further comprising the steps
(iv)–(vi), executed by each one of said I recipient participants:
  (iv) receiving over said public communication channel t or t-1 encoded sub secrets from said t or t-1 participants, respectively; the t or t-1 encoded sub secrets being generated, each, by one and different participant from among said t or t-1 participants, by applying to said sub secret an encoding function which utilizes a key constituent from among said n-1 key constituents that is adapted for communicating between said one participant and said recipient participant;
  (v) decoding each one of said t or t-1 encoded sub secrets so as to obtain t or t-1 decoded sub secrets; the t or t-1 decoded sub secrets are obtained, each, by applying thereto a decoding function that utilizes said key constituent, stipulated in step (iv), that is adapted for communication between said one participant and said recipient participant, thereby accomplishing t sub secrets; and
  (vi) reconstructing said secret from the t sub secrets.

9. A method according to claim 8, wherein said key is serving for generating said n-1 key constituent and wherein said P=t.

10. A method according to claim 9, wherein said key is generated by utilizing a Bloom technique.

11. A method according to claim 8, wherein said secret reconstruction procedure comprising an initial step of dividing said n participants into disjoint subsets t, 2t, . . . $2^i$t and possibly additional subset of size t, partially overlapping one of said disjoint sets, such that each one of said n participants belongs to one, or two, of said subsets.

12. A method according to claim 1, wherein l≧t.
13. A method according to claim 6, wherein l≧t.
14. A method according to claim 7, wherein l≧t.
15. A method according to claim 7, wherein l>t.
16. A method according to claim 7, wherein l=t.
17. A method according to claim 1, wherein both said encoding and decoding functions being a modular add function.
18. A method according to claim 6, wherein both said encoding and decoding functions being a modular add function.
19. A method according to claim 7, wherein both said encoding and decoding functions being a modular add function.
20. A method according to claim 8, wherein both said encoding and decoding functions being a modular add function.
21. A method according to claim 1, wherein both said encoding and decoding functions being a logical xor function.
22. A method according to claim 6, wherein both said encoding and decoding functions being a logical xor function.
23. A method according to claim 7, wherein both said encoding and decoding functions being a logical xor function.
24. A method according to claim 8, wherein both said encoding and decoding functions being a logical xor function.
25. A method according to claim 1, wherein said key constituent being a one time pad.
26. A method according to claim 6, wherein said key constituent being a one time pad.
27. A method according to claim 7, wherein said key constituent being a one time pad.
28. A method according to claim 8, wherein said key constituent being a one time pad.

29. A system for reconstructing a secret, over a public communication channel, using a perfect t-out-of-n secret sharing scheme; the t-out-of-n secret sharing scheme having a dealing means for privately dealing n secret shares of said secret along with n keys to respective n participants interlinked by said public communication channel; for each participant, the key that is dealt thereto is composed of, or is associated with generating means for generating n-1 key constituents for respectively communicating, over said public communication channel, with the remaining n-1 participants from among said n participants;

said secret sharing scheme further having a secret reconstructing means associated with each of at least one recipient participant selected from a group of l participants from among said n participants, for reconstructing said secret by utilizing self secret share of said recipient participant and l-1 secret shares of the remaining l-1 participants from among said l participants;
  said secret reconstructing means associated with each of said at least one recipient participant is capable of:
    (i) receiving over said public communication channel l-1 encoded secret shares from the l-1 participants, respectively; the l-1 encoded secret shares being generated, each, by one and different participant from among said l-1 participants, by applying an encoding function which utilizes a key constituent from among said n-1 key constituents that is adapted for communicating between said one participant and said recipient participant;
    (ii) decoding each one of said l-1 encoded secret shares, thereby obtaining l-1 decoded secret shares; the l-1 decoded secret share are obtained, each, by applying a decoding function that utilizes said key constituent, stipulated in step (i), that is adapted for communication between said one participant and said recipient participant; and
    (iii) reconstructing said secret from the l-1 decoded secret shares and from the self secret share of the recipient participant.

30. The system according to claim 29 wherein said n participants are further interlinked by means of private communication channel and wherein said delivering procedure is executed over said private communication channel.

31. The system according to claim 30, wherein said delivering procedure employs a Shamir technique.

32. The system according to claim 30, wherein said delivering procedure employs a Blakely technique.

33. The system according to claim 29, wherein the size of the secret share equals the size of the secret.

34. The system according to claim 29, wherein said reconstruction means is associated with exactly one recipient participant selected from the group of said l participants, and wherein said reconstructing means is further capable of:

(iv) transmitting over said public communication channel 1-1 encoded messages to the l-1 participants, respectively; the l-1 encoded messages being generated, each, by applying to said secret an encoding function which utilizes a key constituent from among said n-1 key constituents that is adapted for communication between one and different participant, from among said l-1 participants, and said recipient participant; and for executing by each one of said l-1 participants:

(v) receiving over said public communication channel, an encoded message from among said l-1 encoded messages and decoding it so as to obtain a decoded secret; the decoded secret is obtained by applying to the encoded message a decoding function that utilizes the key constituent stipulated in step (iv) that is adapted for communication between one and different participant and said recipient participant.

35. The system according to claim 29, wherein each one of said l participants constitutes said recipient participant.

36. The system according to claim 29, wherein $l \geq t$.

37. The system according to claim 34, wherein $l \geq t$.

38. The system according to claim 29, wherein both said encoding and decoding functions being a modular add function.

39. The system according to claim 34, wherein both said encoding and decoding functions being a modular add function.

40. The system according to claim 29, wherein both said encoding and decoding functions being a logical xor function.

41. The system according to claim 34, wherein both said encoding and decoding functions being a logical xor function.

42. The system according to claim 29, wherein said key constituent being a one time pad.

43. The system according to claim 34, wherein said key constituent being a one time pad.

* * * * *